US011424484B2

(12) United States Patent
Bolton

(10) Patent No.: US 11,424,484 B2
(45) Date of Patent: Aug. 23, 2022

(54) ZINC BATTERY ELECTROLYTE ADDITIVE

(71) Applicant: Octet Scientific, Inc., Cleveland, OH (US)

(72) Inventor: Onas Bolton, Pepper Pike, OH (US)

(73) Assignee: Octet Scientific, Inc., Cleveland, OH (US)

( * ) Notice: Subject to any disclaimer, the term of this patent is extended or adjusted under 35 U.S.C. 154(b) by 211 days.

(21) Appl. No.: 16/752,170

(22) Filed: Jan. 24, 2020

(65) Prior Publication Data

US 2020/0243909 A1 Jul. 30, 2020

Related U.S. Application Data

(60) Provisional application No. 62/796,296, filed on Jan. 24, 2019.

(51) Int. Cl.
*H01M 10/0567* (2010.01)
*H01M 4/133* (2010.01)
*H01M 4/24* (2006.01)
*H01M 12/06* (2006.01)

(52) U.S. Cl.
CPC ....... *H01M 10/0567* (2013.01); *H01M 4/133* (2013.01); *H01M 4/244* (2013.01); *H01M 12/06* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 3,519,631 A | 7/1970 | Ost et al. | |
| 4,029,854 A | 6/1977 | Walsh et al. | |
| 4,034,107 A | 7/1977 | King et al. | |
| 4,132,837 A | 1/1979 | Soffer | |
| 4,407,907 A | 10/1983 | Takamura et al. | |
| 4,482,616 A | 11/1984 | Connolly et al. | |
| 5,041,194 A | 8/1991 | Mori et al. | |
| 5,130,211 A | 7/1992 | Wilkinson et al. | |
| 5,264,131 A | 11/1993 | Ishida et al. | |
| 6,027,827 A | 2/2000 | Gan et al. | |
| 6,083,647 A | 7/2000 | Noda et al. | |
| 6,153,328 A | 11/2000 | Colborn | |
| 6,558,838 B1 | 5/2003 | Noda et al. | |
| 7,722,988 B2 | 5/2010 | Webber | |
| 8,168,337 B2 | 5/2012 | Friesen et al. | |
| 8,309,259 B2 | 11/2012 | Friesen et al. | |
| 8,481,207 B2 | 7/2013 | Friesen et al. | |
| 8,741,491 B2 | 6/2014 | Wolfe et al. | |
| 9,147,919 B2 | 9/2015 | Friesen et al. | |
| 9,312,572 B2 | 4/2016 | Trimble et al. | |
| 9,768,472 B2 | 9/2017 | Friesen et al. | |
| 2001/0038937 A1 | 11/2001 | Suzuki et al. | |
| 2002/0127475 A1 | 9/2002 | Marchionni et al. | |
| 2003/0065037 A1 | 4/2003 | Mattison et al. | |
| 2004/0241537 A1 | 12/2004 | Okuyama et al. | |
| 2005/0171355 A1 | 8/2005 | Kuwabara et al. | |
| 2005/0189231 A1 | 9/2005 | Capper et al. | |
| 2005/0194561 A1 | 9/2005 | Davis, Jr. | |
| 2007/0243449 A1 | 10/2007 | Sotomura et al. | |
| 2008/0021037 A1 | 1/2008 | Beylin et al. | |
| 2008/0096061 A1 | 4/2008 | Burchardt | |
| 2008/0251759 A1 | 10/2008 | Kalb et al. | |
| 2009/0239132 A1 | 9/2009 | Johnson | |
| 2009/0242414 A1 | 11/2009 | Welz-Biermann et al. | |
| 2010/0016603 A1 | 1/2010 | Sonoda et al. | |
| 2010/0119883 A1 | 5/2010 | Friesen et al. | |
| 2010/0119895 A1 | 5/2010 | Friesen et al. | |
| 2010/0137460 A1 | 6/2010 | Bert et al. | |
| 2010/0266907 A1 | 10/2010 | Yazami | |
| 2010/0285375 A1 | 11/2010 | Friesen et al. | |
| 2010/0316935 A1 | 12/2010 | Friesen et al. | |
| 2010/0323249 A1 | 12/2010 | Fujiwara et al. | |
| 2011/0027664 A1 | 2/2011 | Burchardt et al. | |
| 2011/0039181 A1 | 2/2011 | Friesen et al. | |
| 2011/0059355 A1 | 3/2011 | Zhang et al. | |
| 2011/0065018 A1 | 3/2011 | Kim et al. | |
| 2011/0070506 A1 | 3/2011 | Friesen et al. | |
| 2011/0086278 A1 | 4/2011 | Friesen et al. | |
| 2011/0091777 A1 | 4/2011 | Mizuno et al. | |
| 2011/0152292 A1 | 6/2011 | Rayner-Branes et al. | |
| 2011/0177428 A1 | 7/2011 | Dai et al. | |
| 2011/0189551 A1 | 8/2011 | Friesen et al. | |
| 2011/0200893 A1 | 8/2011 | Friesen et al. | |
| 2011/0250512 A1 | 10/2011 | Friesen et al. | |
| 2011/0281184 A1 | 11/2011 | Friesen et al. | |
| 2011/0305959 A1 | 12/2011 | Friesen et al. | |
| 2011/0316485 A1 | 12/2011 | Krishnan et al. | |
| 2012/0009491 A1 | 1/2012 | Friesen et al. | |
| 2012/0015264 A1 | 1/2012 | Friesen et al. | |
| 2012/0052404 A1 | 3/2012 | Friesen et al. | |
| 2012/0068667 A1 | 3/2012 | Friesen et al. | |
| 2012/0098499 A1 | 4/2012 | Friesen et al. | |
| 2012/0121992 A1 | 5/2012 | Friesen et al. | |
| 2012/0139496 A1 | 6/2012 | Krishnan et al. | |
| 2012/0202127 A1 | 8/2012 | Friesen et al. | |

(Continued)

FOREIGN PATENT DOCUMENTS

| | | |
|---|---|---|
| CN | 1581567 A | 2/2005 |
| CN | 1627554 A | 6/2005 |
| CN | 1946673 A | 4/2007 |
| CN | 101137436 A | 3/2008 |
| CN | 101174698 A | 5/2008 |

(Continued)

OTHER PUBLICATIONS

Liu et al. 'Experimental and Modeling Studies of the Hysteresis Behavior and Dendrite 1-7, 9 ., Suppression Efficacy of an Electrolyte Additive in Zinc Electrodaposition' Aug. 16, 2019 Journal of Electrochemical Society, 166 (13) D583-D588. Entirety of document especially p. D583 para 1; p. D583 col. 1 para 2; p. D583 col. 2 para 3-4; p. D584 col. 1 para 2-3; Figure 1.

(Continued)

*Primary Examiner* — Laura Weiner

(57) ABSTRACT

An electrolyte additive is provided. The additive is a quaternary ammonium or phosphonium salt effective to suppress hydrogen evolution and metal dendrite formation during operation of a zinc electrochemical cell such as a zinc-air battery. A zinc battery cell is also provided, which contains an effective amount of the electrolyte additive.

4 Claims, 32 Drawing Sheets

(56) References Cited

U.S. PATENT DOCUMENTS

| | | |
|---|---|---|
| 2012/0321967 A1 | 12/2012 | Wolfe et al. |
| 2012/0321969 A1 | 12/2012 | Friesen et al. |
| 2012/0321970 A1 | 12/2012 | Friesen et al. |
| 2012/0323004 A1 | 12/2012 | Friesen et al. |
| 2013/0022881 A1 | 1/2013 | Friesen et al. |
| 2013/0095393 A1 | 4/2013 | Friesen et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115532 A1 | 5/2013 | Friesen et al. |
| 2013/0115533 A1 | 5/2013 | Friesen et al. |
| 2013/0157148 A1 | 6/2013 | Friesen et al. |
| 2013/0230524 A1 | 9/2013 | Burgess |
| 2014/0072886 A1 | 3/2014 | Urban et al. |
| 2018/0316064 A1 | 11/2018 | Wei et al. |

FOREIGN PATENT DOCUMENTS

| | | | |
|---|---|---|---|
| CN | 102050788 A | | 5/2011 |
| CN | 102299389 A | | 12/2011 |
| CN | 104752777 A | | 7/2015 |
| EP | 1182196 A1 | | 2/2002 |
| EP | 1398318 A1 | | 3/2004 |
| GB | 1297955 A | | 11/1972 |
| JP | 50091728 | * | 7/1975 |
| JP | H06293991 A | | 10/1994 |
| JP | 2001266961 A | | 9/2001 |
| JP | 2002509528 A | | 3/2002 |
| JP | 2002184472 A | | 6/2002 |
| JP | 2003-151569 | * | 5/2003 |
| JP | 2005026023 A | | 1/2005 |
| JP | 2007087939 A | | 4/2007 |
| JP | 2007518772 A | | 7/2007 |
| JP | 2010146851 A | | 7/2010 |
| JP | 2010-176930 | * | 8/2010 |
| WO | 2005003108 A1 | | 1/2005 |
| WO | 2006072785 A2 | | 7/2006 |
| WO | 2008013095 A1 | | 1/2008 |
| WO | 2010000396 A1 | | 1/2010 |
| WO | 2010132357 A1 | | 11/2010 |
| WO | 2010136783 A1 | | 12/2010 |
| WO | 2011049184 A1 | | 4/2011 |
| WO | 2012111101 A1 | | 8/2012 |
| WO | 2012174564 A1 | | 12/2012 |
| WO | 2015136860 A1 | | 9/2015 |
| WO | 2017070340 A1 | | 4/2017 |

OTHER PUBLICATIONS

WikipedIa 'Zinc-air battery' Jan. 31, 2019 (Jan. 31, 2019). Retrieved from <https://en.wikipedia.org/w/index.php?title=ZInc%E2%80%93air_battery&oldid=881000599>entirety of document especially p. 1 para 1.

Website, https://nantenergy.com/zinc-air/ 'Zinc-air Storage, Rugged, long-duration, pollution-free energy storage systems for use in any location' © 2019 NantEnergy Inc., accessed Jan. 12, 2021.

Eric Wesoff, Fluidic Energy Is the Biggest Zinc-Air Battery Startup You Haven't Heard Of, Article, Nov. 16, 2015, https://www.greentechmedia.com/articles/read/fluidic-energy-is-the-biggest-zinc-air-battery-startup-you-havent-heard-of#gs.w6i91Po, Greentech Media, Inc., Massachusetts, United States., accessed Jan. 12, 2021.

Eric Wesoff, Fluidic Energy Is the Biggest Zinc-Air Battery Startup You Haven't Heard Of, Article, Nov. 16, 2015, https://www.greentechmedia.com/articles/read/fluidic-energy-is-the-biggest-zinc-air-battery-startup-you-havent-heard-of#gs.w6i91Po, Greentech Media, Inc., Massachusetts, United States.

Fluidic Energy, Inc., Website, http://fluidicenergy.com/, Scottsdale, Arizona, United States.

* cited by examiner

ZINC BATTERY ELECTROLYTE ADDITIVE

This invention was made with government support under contract number NSF 1746210 awarded by the National Science Foundation. The government has certain rights in the invention.

I. BACKGROUND OF THE INVENTION

A. Field of Invention

The invention generally relates to chemical additives for zinc battery electrolytes.

B. Description of the Related Art

Despite their attractive cost and safety, batteries that utilize zinc as their anode material suffer from several problems intrinsic to this metal. Among these are 1) the formation of dendrites during recharging and 2) parasitic side reactions such as the evolution of hydrogen gas from the electrolyte reacting at the zinc surface. These problems have contributed to both limit the penetration of zinc batteries into certain markets and to prevent the emergence of otherwise promising zinc battery chemistries such as Zinc-Air. Dendrite formation reduces battery efficiency and can lead to cell failure. Hydrogen evolution can cause reduced shelf life due to self-discharge as well as mechanical damage due to pressure buildup.

It is known to use additives to suppress dendrite formation and hydrogen evolution; however, few known additives are effective at suppressing dendrite formation and hydrogen evolution. Moreover, known additives exhibit certain negative properties such as loss of cell efficiency. Some embodiments of the present invention may provide one or more benefits or advantages over the prior art.

II. SUMMARY OF THE INVENTION

Embodiments of the invention may relate to electrolyte additives for partially or fully suppressing dendrite formation and hydrogen evolution in zinc batteries. Embodiments include a zinc electrochemical battery cell incorporating the additives. Embodiments also include electrolyte additive chemical compositions comprising quaternary ammonium or phosphonium salts.

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

The term "effective amount" is used herein to indicate an amount of an electrolyte additive dissolved in a liquid electrolyte that reduces dendrite formation and hydrogen evolution by a measurable and/or visually perceptible amount under the stated test conditions, or where no conditions are stated in 4M potassium hydroxide, 0.1M zinc oxide, and water at −1.6V relative to a Hg/HgO reference electrode for 1500 seconds. However, this is not intended to limit the invention to the stated test conditions. The person having ordinary skill in the art would readily understand that a wide variety of electrolytes and concentrations of electrolytes, for instance, may be appropriate or desirable for a given application. It is well within the skill in the art to select from known electrolytes.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

Embodiments of the invention include organic electrolyte additives that improve zinc battery performance by both selectively preventing dendrite formation and preventing hydrogen evolution side reactions without hindering cell efficiency. Embodiments may include quaternary nitrogen and/or quaternary phosphorous compounds substituted with a variety of linear and/or cyclic organic groups.

Formula I illustrates an embodiment of the invention comprising a central nitrogen or phosphorous atom with a charge of +1, denoted herein as "N/P+" or as an "N/P$^+$ center". The N/P$^+$ center is bonded to four R groups R$^1$, R$^2$, R$^3$, and R$^4$. The structure shown in Formula I is not intended to illustrate isomers or stereochemical structures, but rather is intended to encompass all isomeric forms with the same atom-to-atom connectivity.

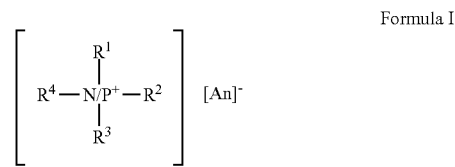

Formula I

R$^1$ is selected from the following radicals, where "yl" or "methylene" refers to the position of the radical electron available for bonding with an N/P+ center: methyl benzene, 4-methylene-toluene, 3-methylene-toluene, 2-methylene-toluene, 4-methylene-chlorobenzene, 3-methylene-chlorobenzene, 2-methylene-chlorobenzene, 4-methylene-bromobenzene, 3-methylene-bromobenzene, 2-methylene-bromobenzene, 4-methylene-iodobenzene, 3-methylene-iodobenzene, 2-methylene-iodobenzene, 4-methylene-cyanobenzene, 3-methylene-cyanobenzene, 2-methylene-cyanobenzene, 4-methylene-anisole, 3-methylene-anisole, 2-methylene-anisole, 1-methylnaphthalene, 1-methylene-2,6-dimethylbenzene, 1-methylene-2,4-dimethylebenzene, 1-methylene-3,4-dimethylbenzene, 1-methylene-2,5-dimethylbenzene, 1-methylene-3,5-dimethylbenzene, 1-methylene-2,4,6-trimethylbenzene, 1-methylene-3,4,5-trimethoxybenzene, 1-methylene-2,6-dichlorobenzene, 4-methylene-nitrobenzene, 4-methylene-benzoic acid, 3-methylene-benzoic acid, 2-methylene-benzoic acid, 2-methylene-phenol, 3-methylene-phenol, and 4-methylene-phenol.

With continuing reference to Formula I, the radicals R$^2$, R$^3$, and R$^4$ may be independently selected from R$^1$, methyl, ethyl, n-propyl, n-butyl, n-pentyl, n-hexyl, n-octyl, n-decyl, n-dodecyl, n-tetradecyl, n-hexadecyl, or n-octadecyl. Radicals R$^2$, R$^3$, and R$^4$ may be independently selected from linear and non-linear alkyls from C1 to C25.

Embodiments conforming to Formula I may include a sufficient amount of counter anion [An] to produce a neutral species. The anion [An] may be, for example and without limitation, chloride, bromide, iodide, fluoride, hydroxide, nitrate, nitrite, sulphate, sulphite, phosphate, perchlorate, or any combination thereof. The person having ordinary skill in the art will readily appreciate that the anion has less or no influence on performance of the electrolyte additives of the present invention. Accordingly, a wide variety of anions are within the scope of the invention, and the foregoing list is meant only to be illustrative.

Figure 1:
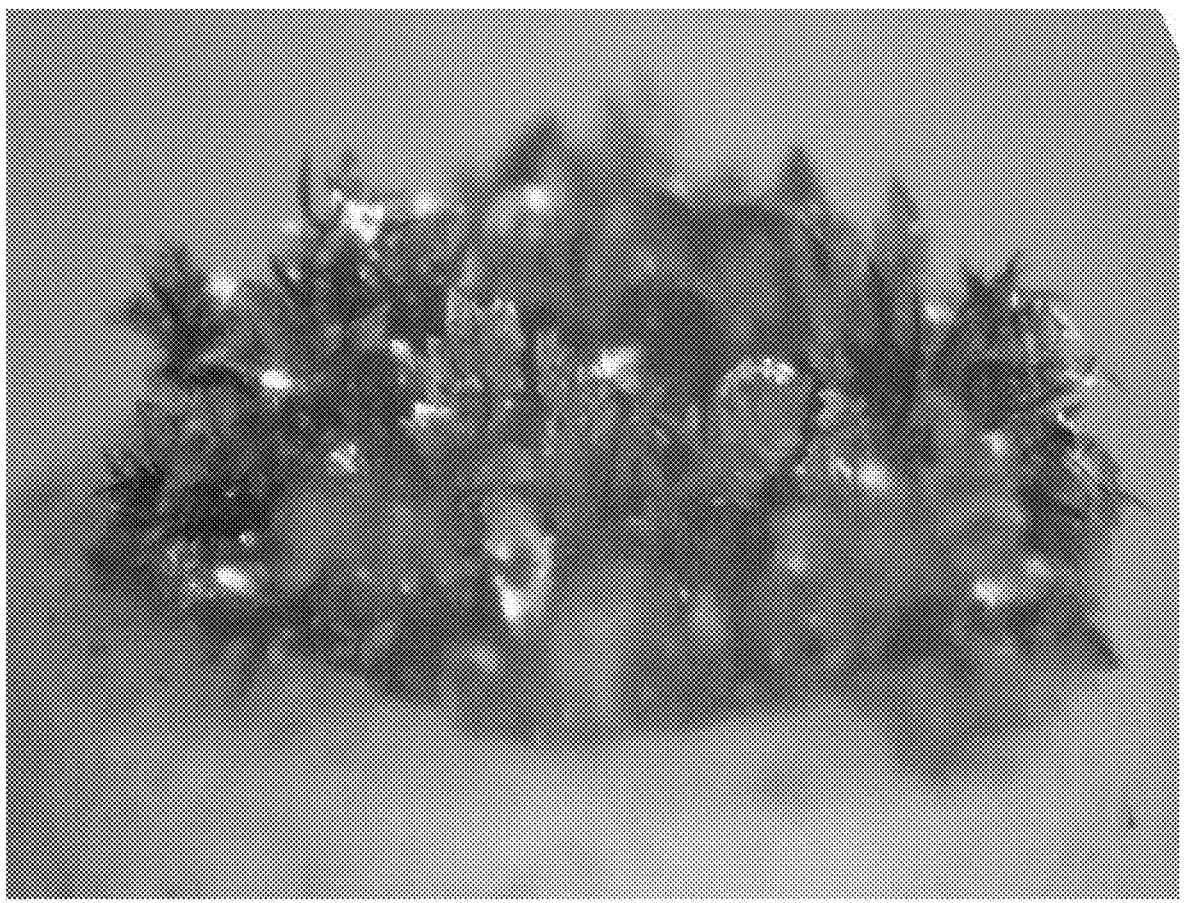
FIG. 1 is a photograph of electrodeposited zinc in a control cell containing no additive after operating the cell for 1500 s.

Referring now to the drawings wherein the showings are for purposes of illustrating embodiments of the invention only and not for purposes of limiting the same, FIG. 1 is a photograph showing dendrite growth using 4M KOH, 0.1M ZnO, and water with no additives suppressing dendrite growth. Plating was conducted at −1.6V relative to a Hg/HgO reference electrode for 1500 seconds. FIG. 1 shows dendrite growth after 1500 seconds. This serves as a control against which dendrite suppression additives are compared in subsequent tests. Each experimental run is conducted under the same conditions as the control run, namely, in 4M KOH electrolyte, 0.1M ZnO, and water at −1.6V relative to a Hg/HgO reference electrode for 1500 seconds. The results are summarized in Table I.

With respect to the control results shown in FIG. 1, prominent dendrite growth is clearly visible. Although the control rapidly evolves hydrogen, the bubbles form so quickly over the entire surface that they do not adhere to the dendrites. Accordingly, very few if any hydrogen bubbles are visible in FIG. 1. In contrast FIGS. 2-18 all show suppression of hydrogen evolution to some degree, which may be complete hydrogen suppression or partial hydrogen suppression. Where hydrogen suppression is complete, no bubbles form on the plated zinc surface so the associated figure shows no hydrogen bubbles. However, where hydrogen evolution is partially suppressed large slow-forming hydrogen bubbles are visible in the associated figure adhering to the plated zinc.

TABLE I

Figure 2:
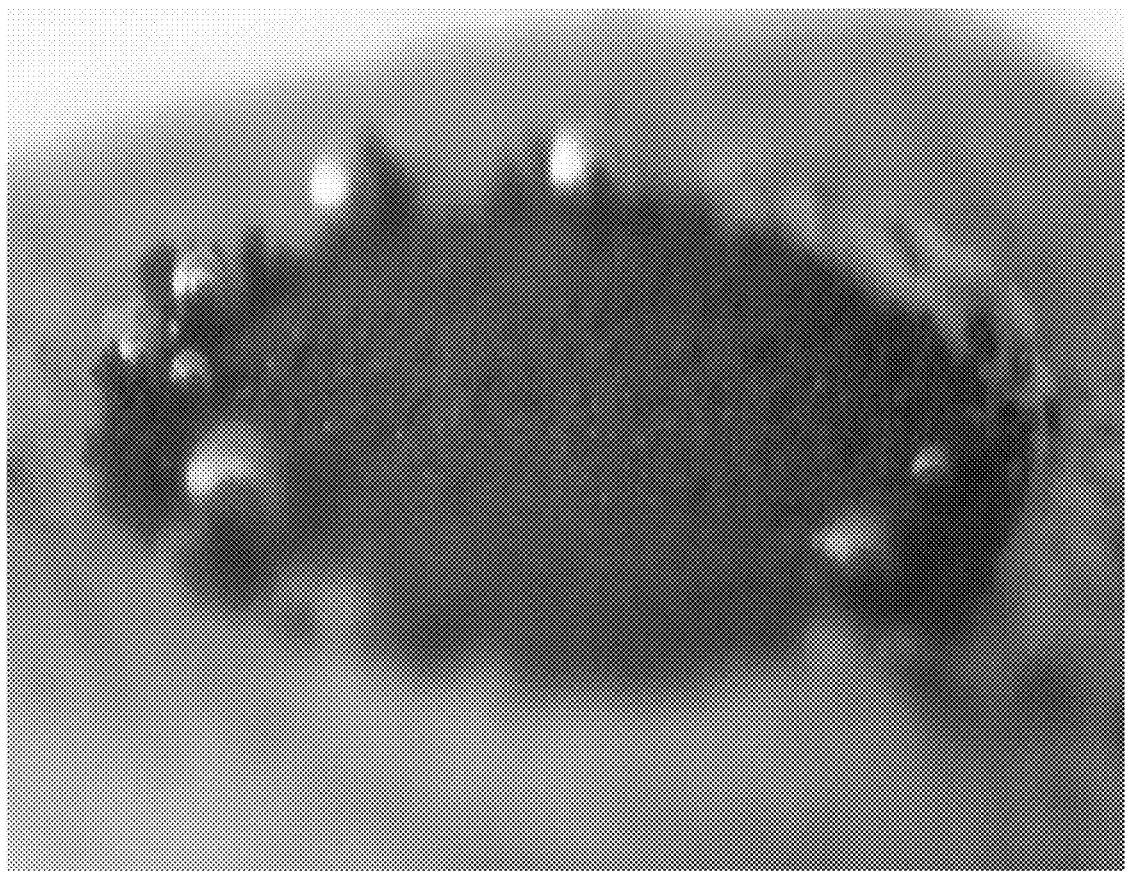
FIG. 2 is a photograph of electrodeposited zinc in a cell containing 1.0 wt % Benzyltrimethylammonium Hydroxide after operating the cell for 1500 s.
Figure 3:
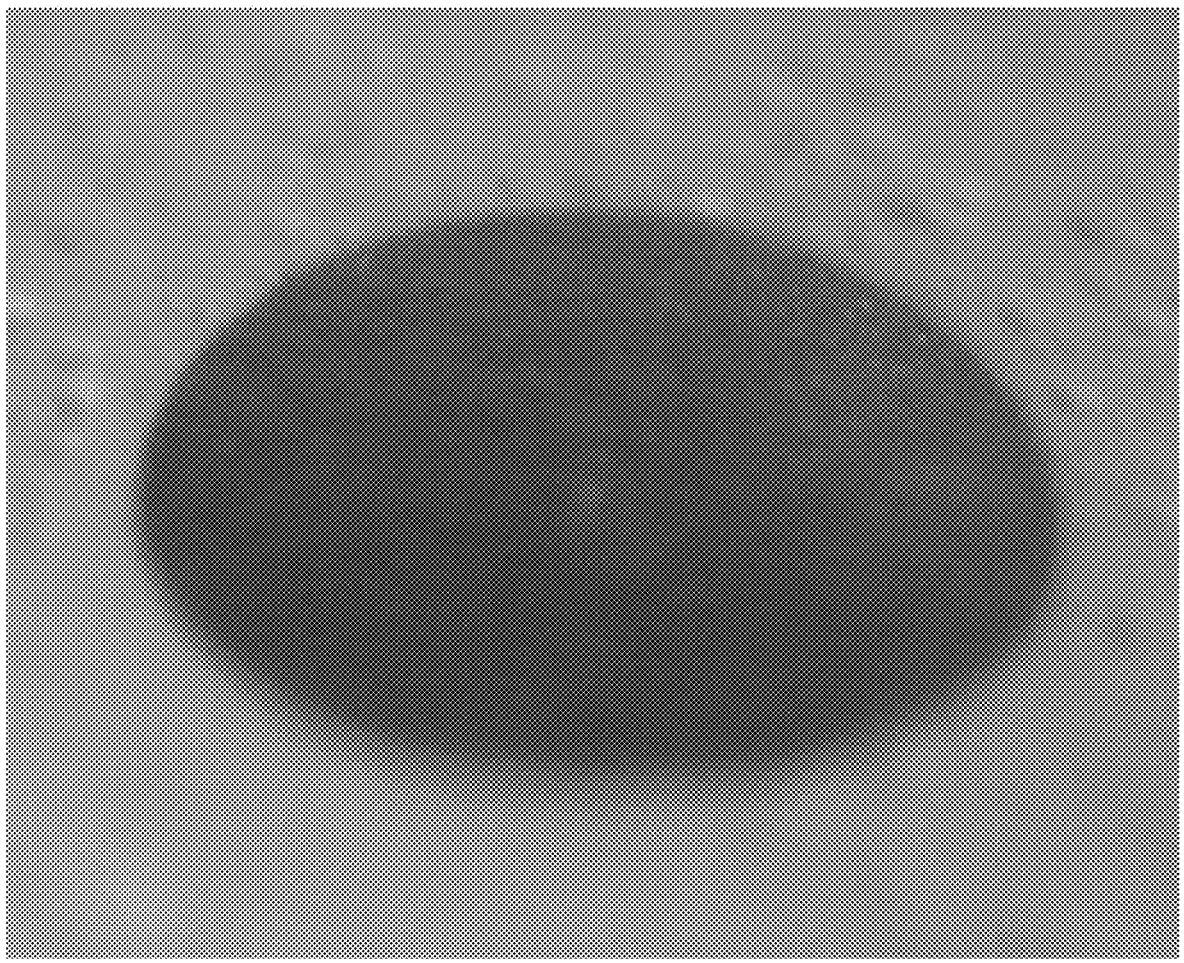
FIG. 3 is a photograph of electrodeposited zinc in a cell containing 1.0 wt % Benzyltributylammonium Chloride after operating the cell for 1500 s.
Figure 4:
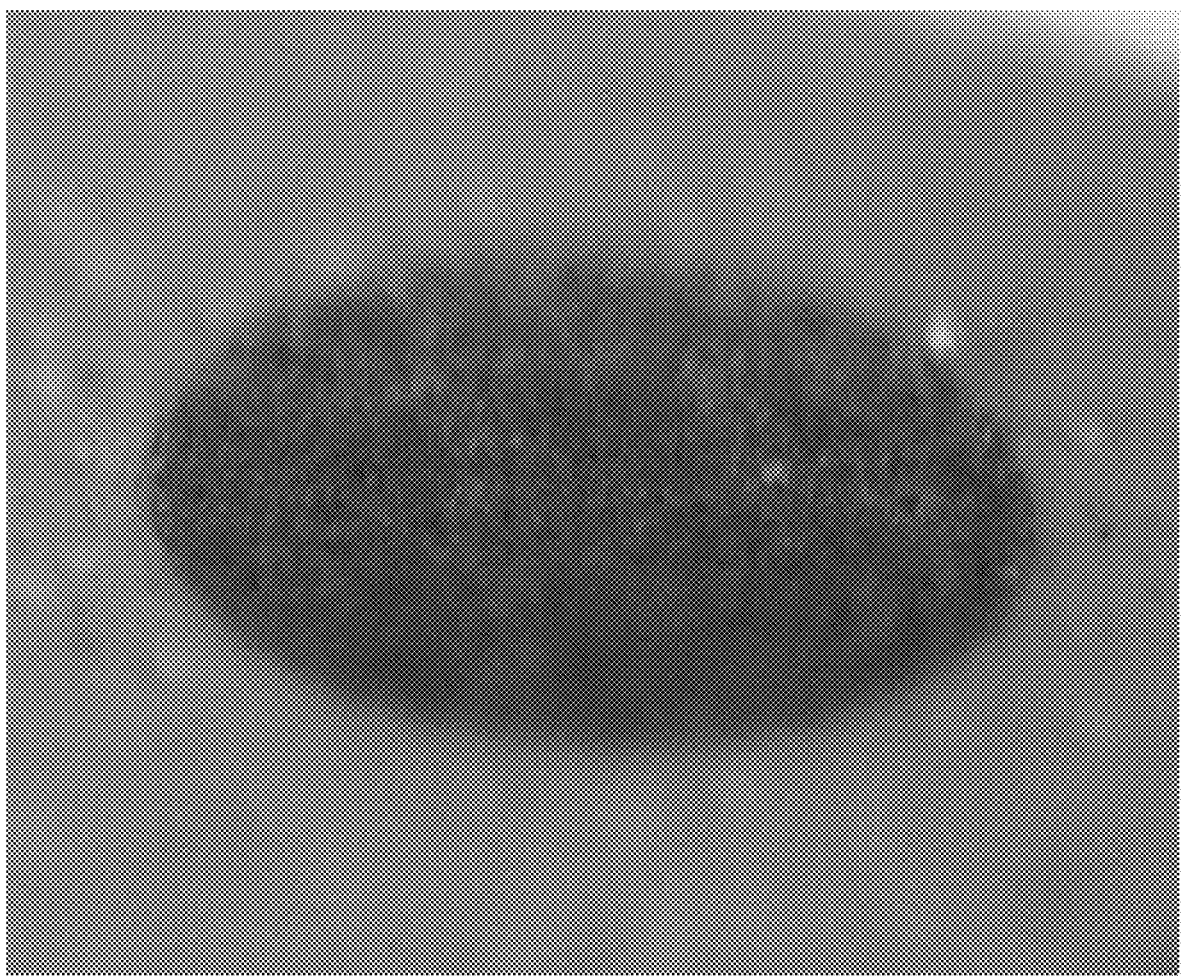
FIG. 4 is a photograph of electrodeposited zinc in a cell containing 1.0 wt % Dibenzyldimethylammonium Chloride after operating the cell for 1500 s.
Figure 5:
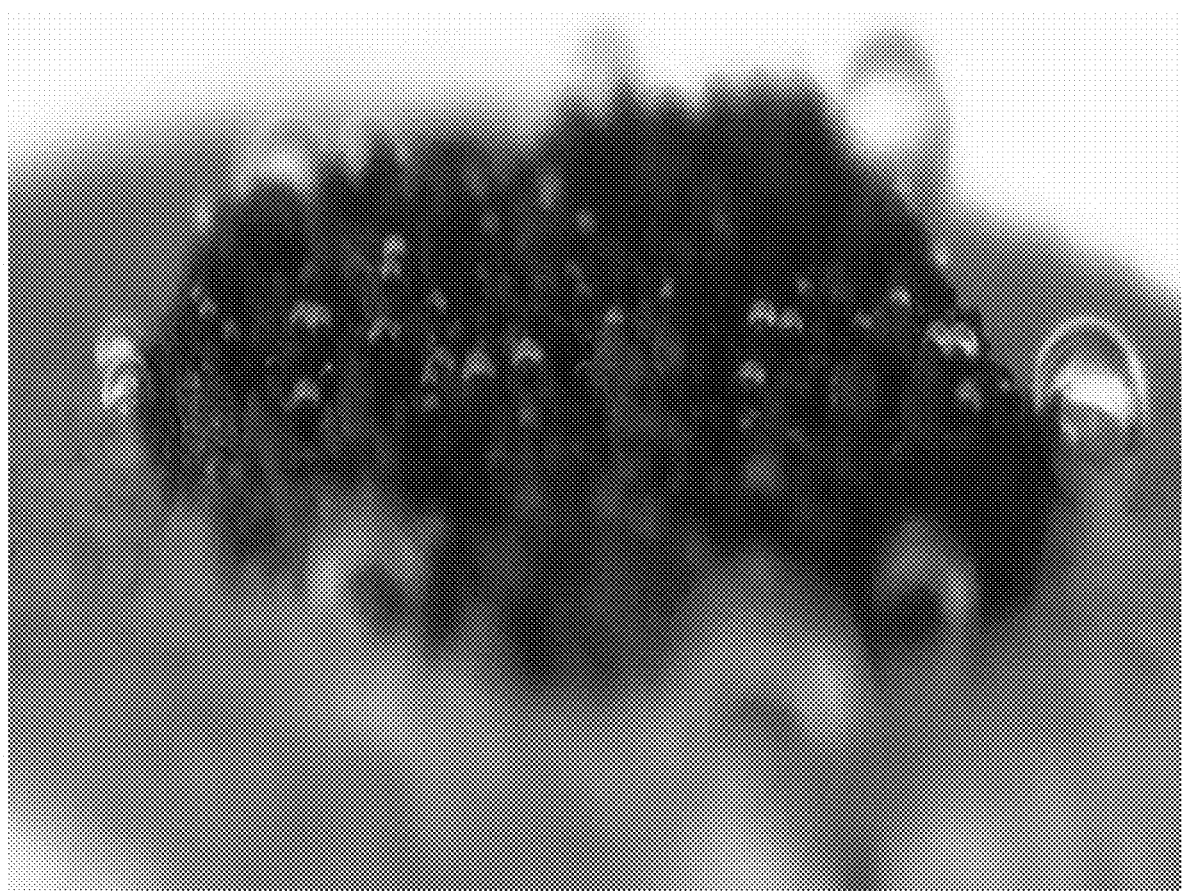
FIG. 5 is a photograph of electrodeposited zinc in a cell containing 0.01 wt % Dibenzyldimethylammonium Chloride after operating the cell for 1500 s.
Figure 6:
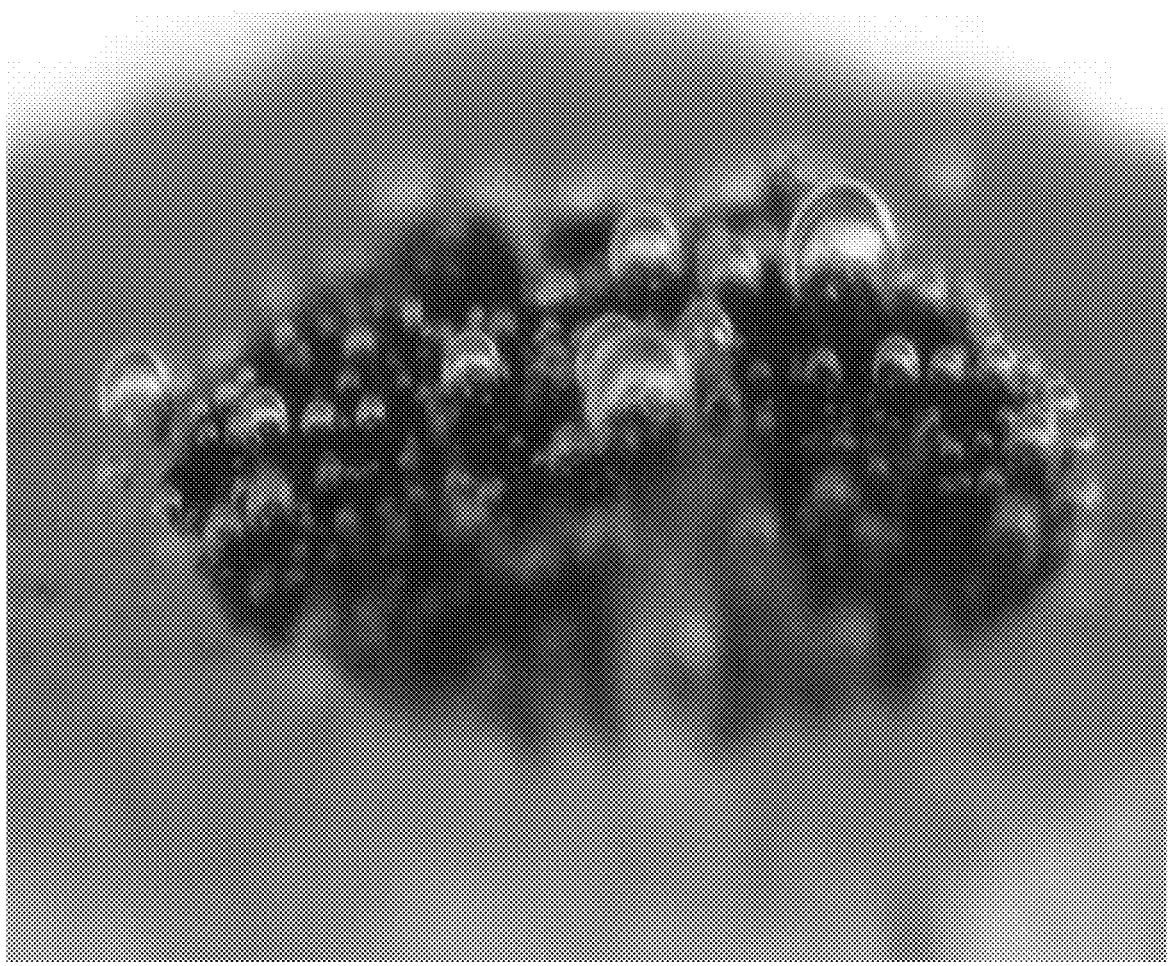
FIG. 6 is a photograph of electrodeposited zinc in a cell containing 0.1 wt % Dibenzyldimethylammonium Chloride after operating the cell for 1500 s.

| Suppression of Dendrite Formation by Additives | | | | |
| --- | --- | --- | --- | --- |
| Additive | Amount (wt %) | Hydrogen Suppressed | Dendrite Suppressed | Figure |
| No additive (control) | 0 | No | No | FIG. 1 |
| Benzyltrimethylammonium Hydroxide (BTMAH) | 1.0 | Partial | Yes | FIG. 2 |
| Benzyltributylammonium Chloride (BTBAC) | 1.0 | Partial | Yes | FIG. 3 |
| Dibenzyldimethylammonium Chloride (DBDMAC) | 1.0 | Partial | Yes | FIG. 4 |
| Dibenzyldimethylammonium Chloride (DBDMAC) | 0.01 | No | Partial | FIG. 5 |
| Dibenzyldimethylammonium Chloride (DBDMAC) | 0.1 | Partial | Yes | FIG. 6 |

TABLE I-continued

Suppression of Dendrite Formation by Additives

Figure 7:
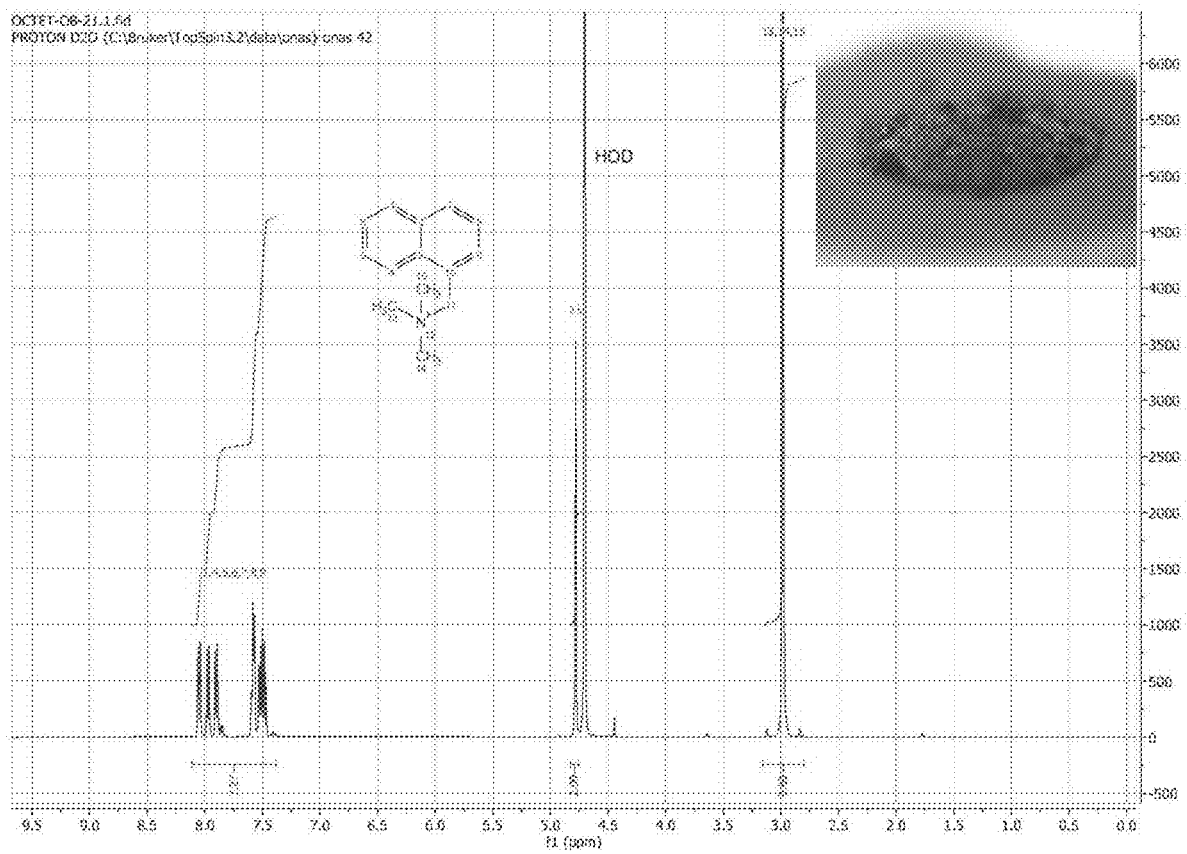
FIG. 7 is $^1$H NMR data for 1-(Trimethylammonium methyl)naphthalene chloride in $D_2O$ with an inlay photograph of electrodeposited zinc in a cell containing 1.0 wt % 1-(Trimethylammonium methyl)naphthalene chloride after operating the cell for 1500 s.
Figure 8:
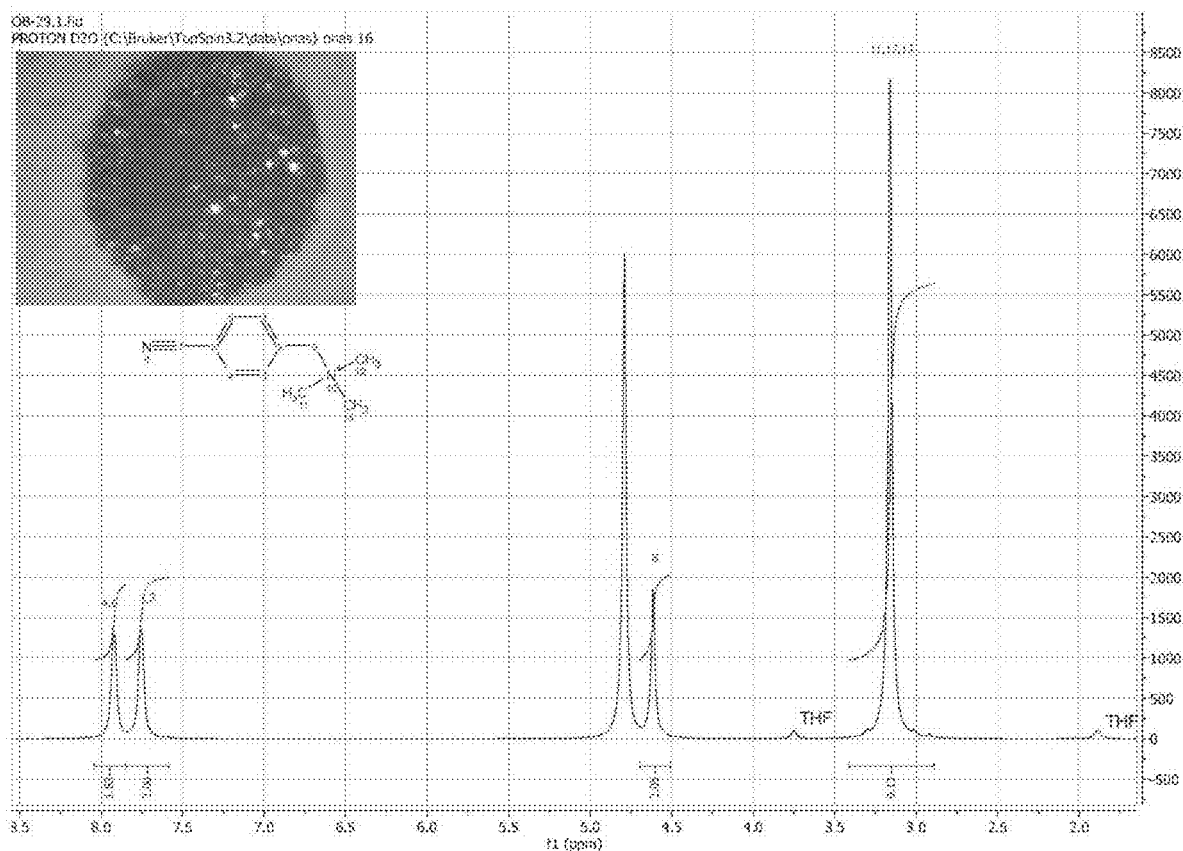
FIG. 8 is $^1$H NMR data for 4-(Trimethylammonium methyl)benzonitrile Chloride in $D_2O$ with an inlay photograph of electrodeposited zinc in a cell containing 1.0 wt % 4-(Trimethylammonium methyl)benzonitrile Chloride after operating the cell for 1500 s.
Figure 9:
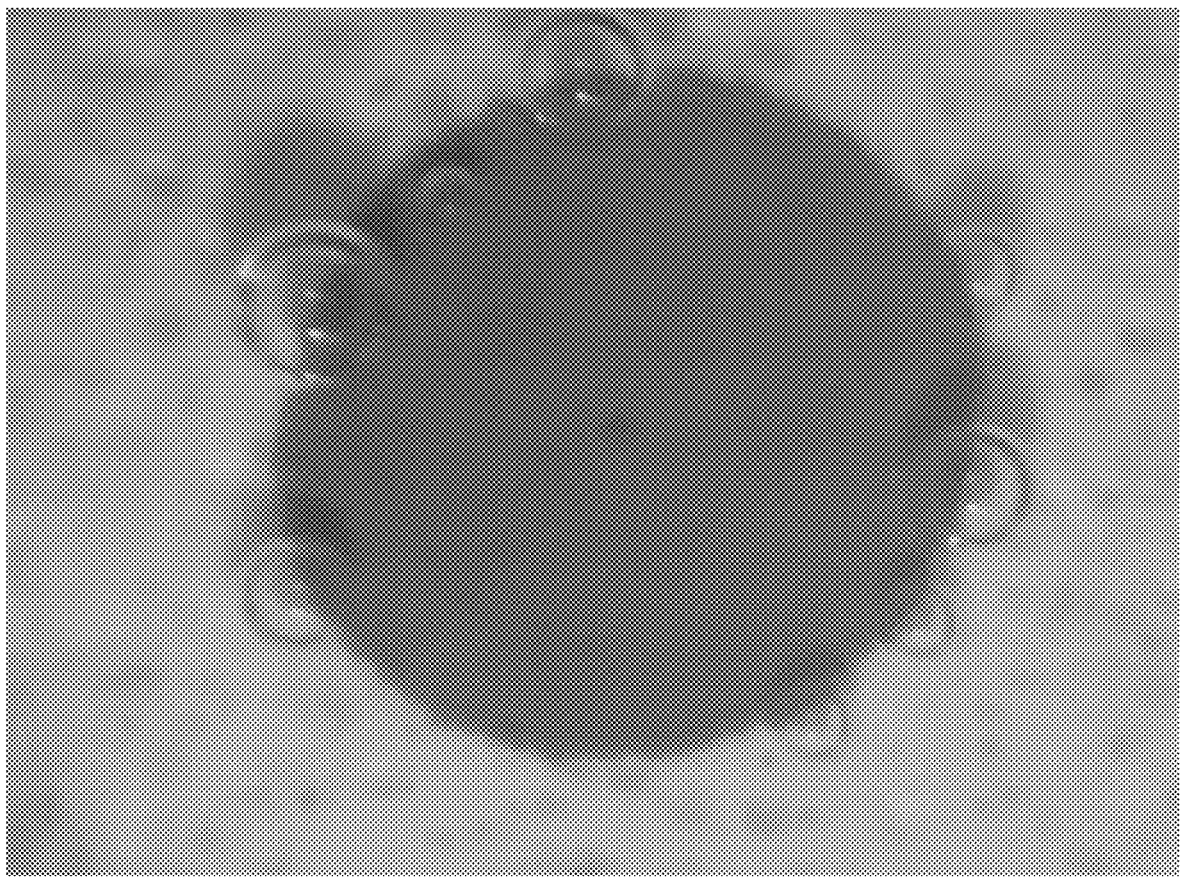
FIG. 9 is a photograph of electrodeposited zinc in a cell containing 1.0 wt % 4-(Trimethylammonium methyl)anisole Chloride after operating the cell for 1500 s.
Figure 10:
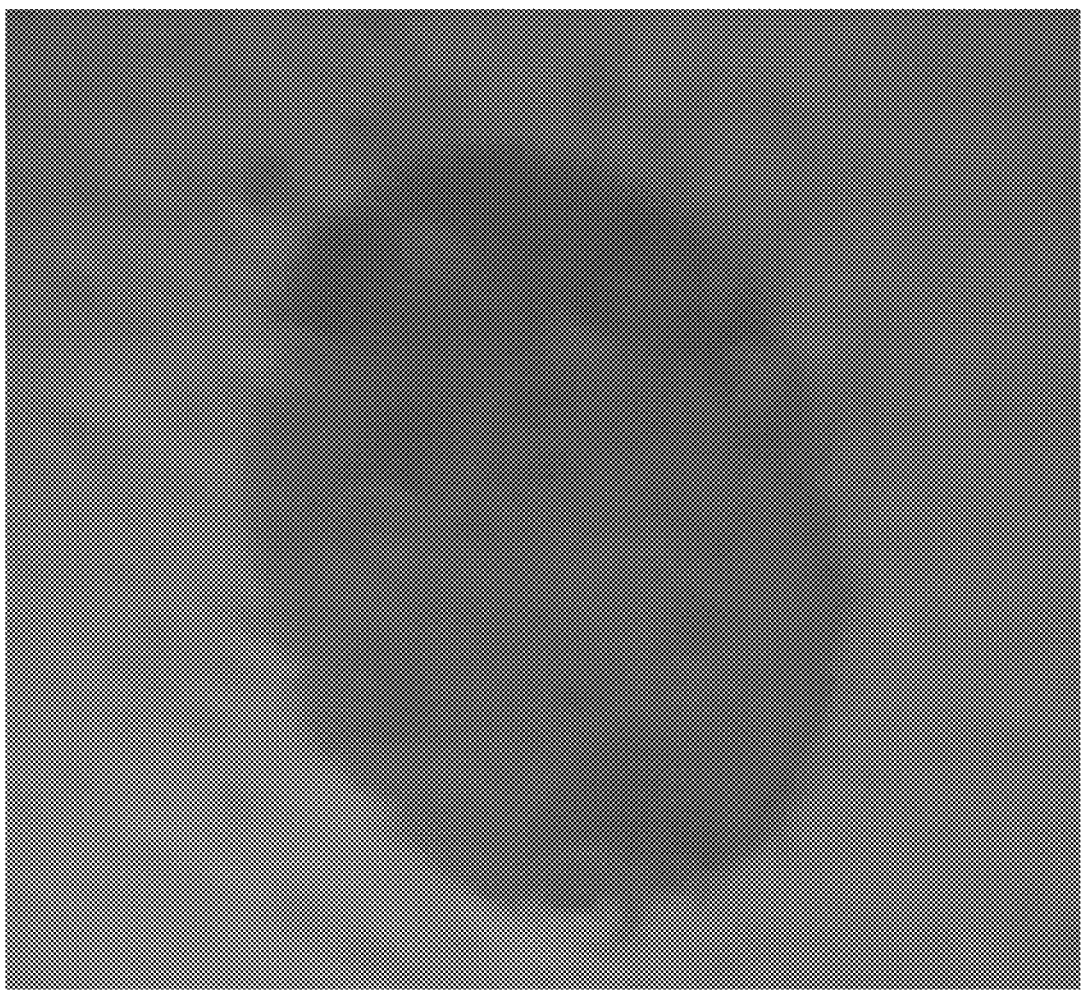
FIG. 10 is a photograph of electrodeposited zinc in a cell containing 0.5 wt % 4-(Trimethylammonium methyl)anisole Chloride after operating the cell for 1500 s.
Figure 11:
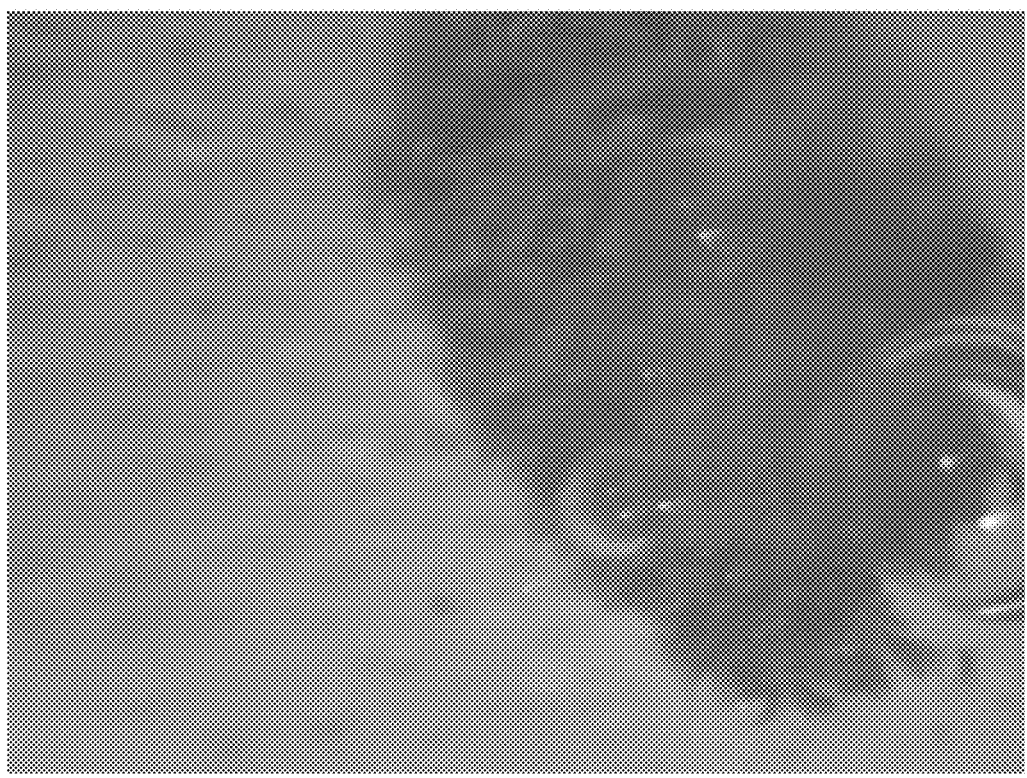
FIG. 11 is a photograph of electrodeposited zinc in a cell containing 0.1 wt % 4-(Trimethylammonium methyl)anisole Chloride after operating the cell for 1500 s.
Figure 12:
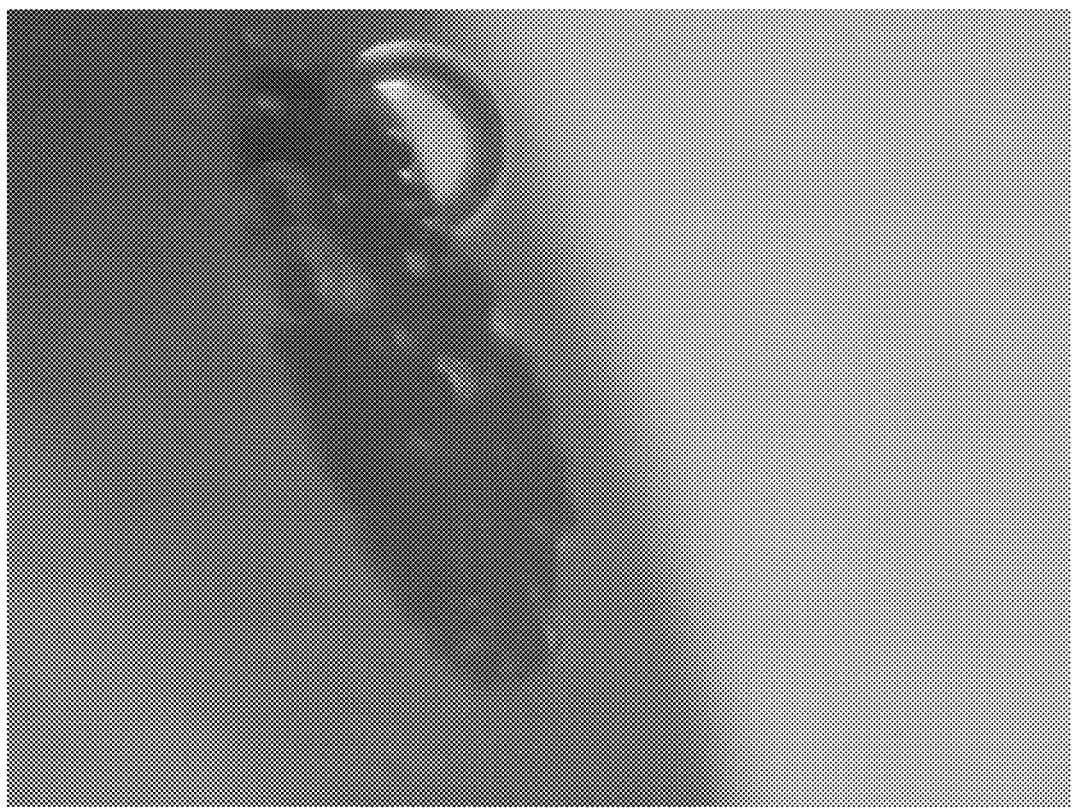
FIG. 12 is a photograph of electrodeposited zinc in a cell containing 1.0 wt % 4-(Trimethylammonium methyl)-1,2,6-trimethoxybenzene after operating the cell for 1500 s.

| Additive | Amount (wt %) | Hydrogen Suppressed | Dendrite Suppressed | Figure |
|---|---|---|---|---|
| 1-(Trimethylammonium methyl)-napthalene Chloride (TMAMNC) | 1.0 | No | Partial | FIG. 7 |
| 4-(Trimethylammonium-methyl)benzonitrile Chloride (TMAMBC) | 1.0 | Yes | Partial | FIG. 8 |
| 4-(Trimethylammonium-methyl)anisole Chloride | 1.0 | Yes | Yes | FIG. 9 |
| 4-(Trimethylammoniummethyl)anisole Chloride | 0.5 | Partial | Yes | FIG. 10 |
| 4-(Trimethylammoniummethyl)anisole Chloride | 0.1 | Partial | Partial | FIG. 11 |
| 4-(Trimethylammoniummethyl)-1,2,6-trimethoxybenzene | 1.0 | Partial | Yes | FIG. 12 |

TABLE I-continued

Suppression of Dendrite Formation by Additives

Figure 13:
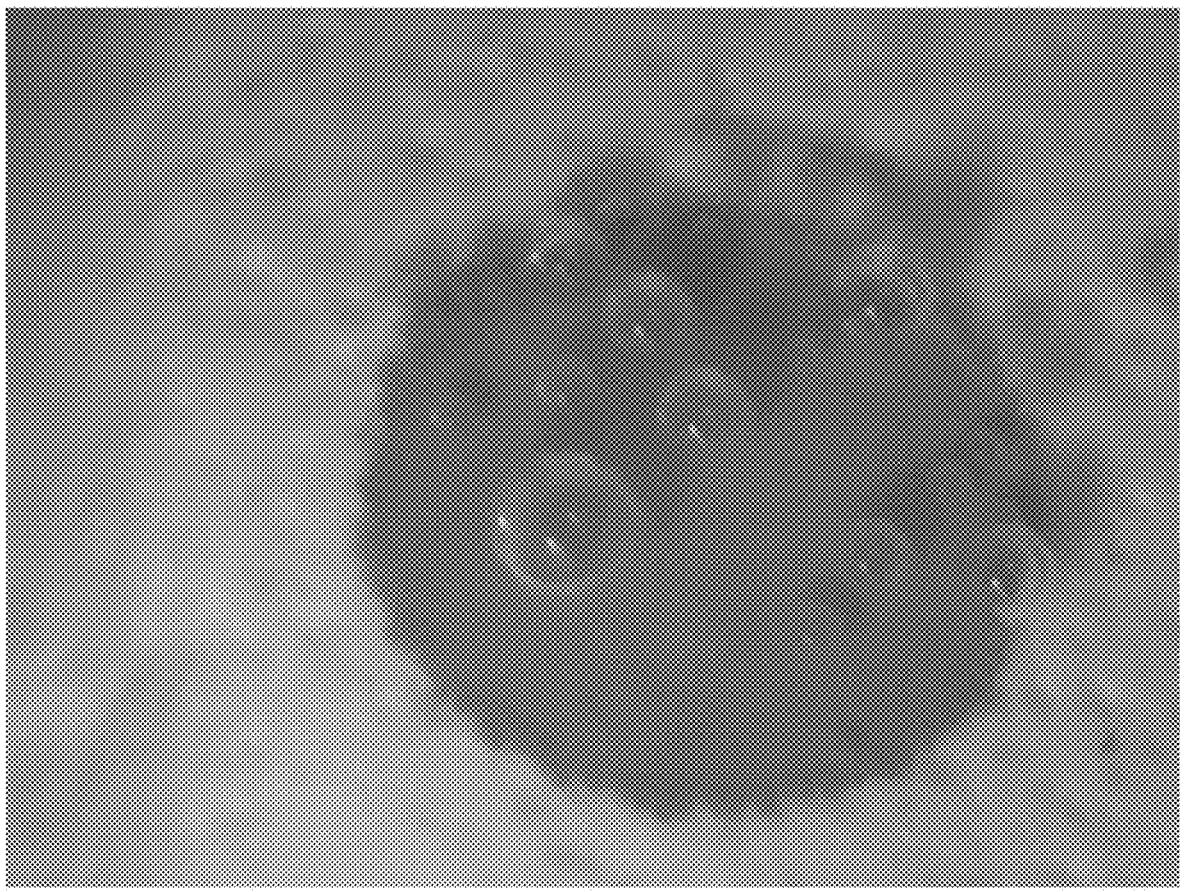
FIG. 13 is a photograph of electrodeposited zinc in a cell containing 1.0 wt % (4-Methylbenzyl)trimethylammonium Chloride after operating the cell for 1500 s.
Figure 14:
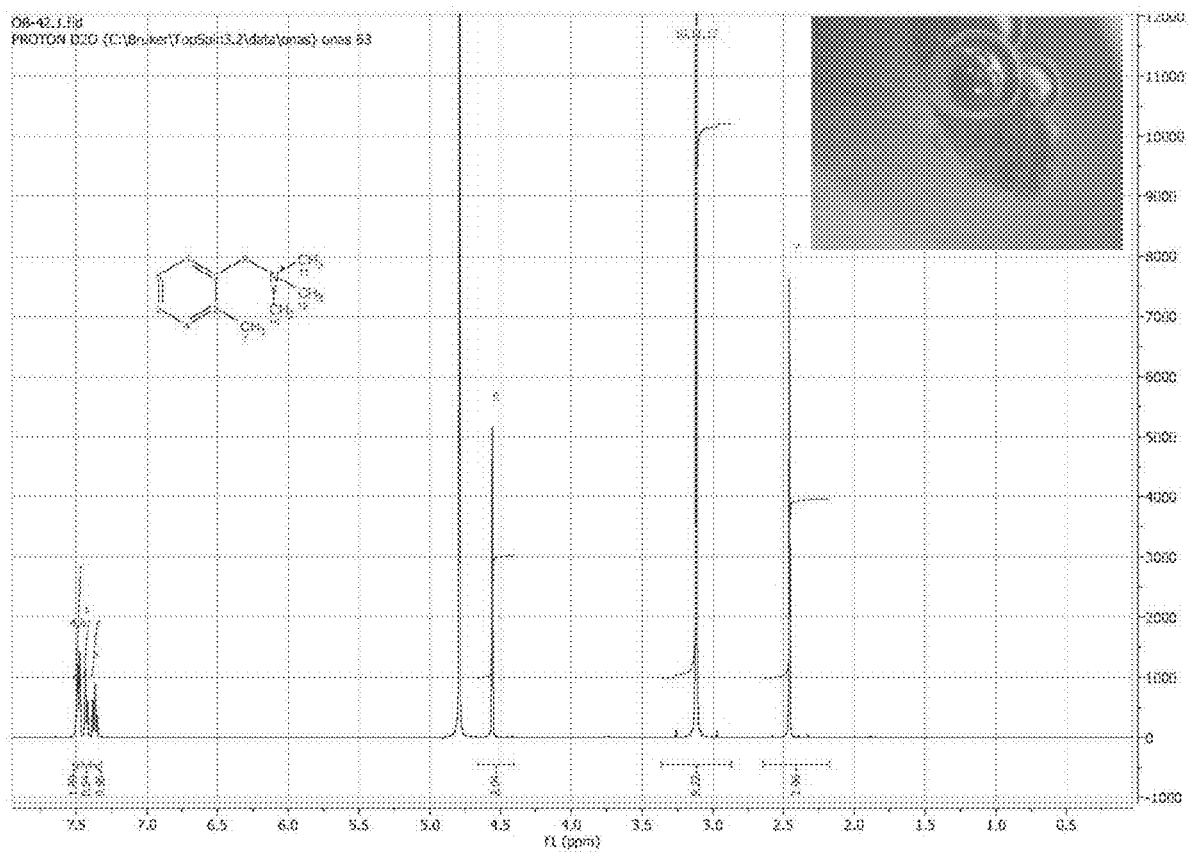
FIG. 14 is $^1$H NMR data for (2-Methylbenzyl)trimethylammonium Chloride in D$_2$O with an inlay photograph of electrodeposited zinc in a cell containing 1.0 wt % (2-Methylbenzyl)trimethylammonium Chloride after operating the cell for 1500 s.
Figure 15:
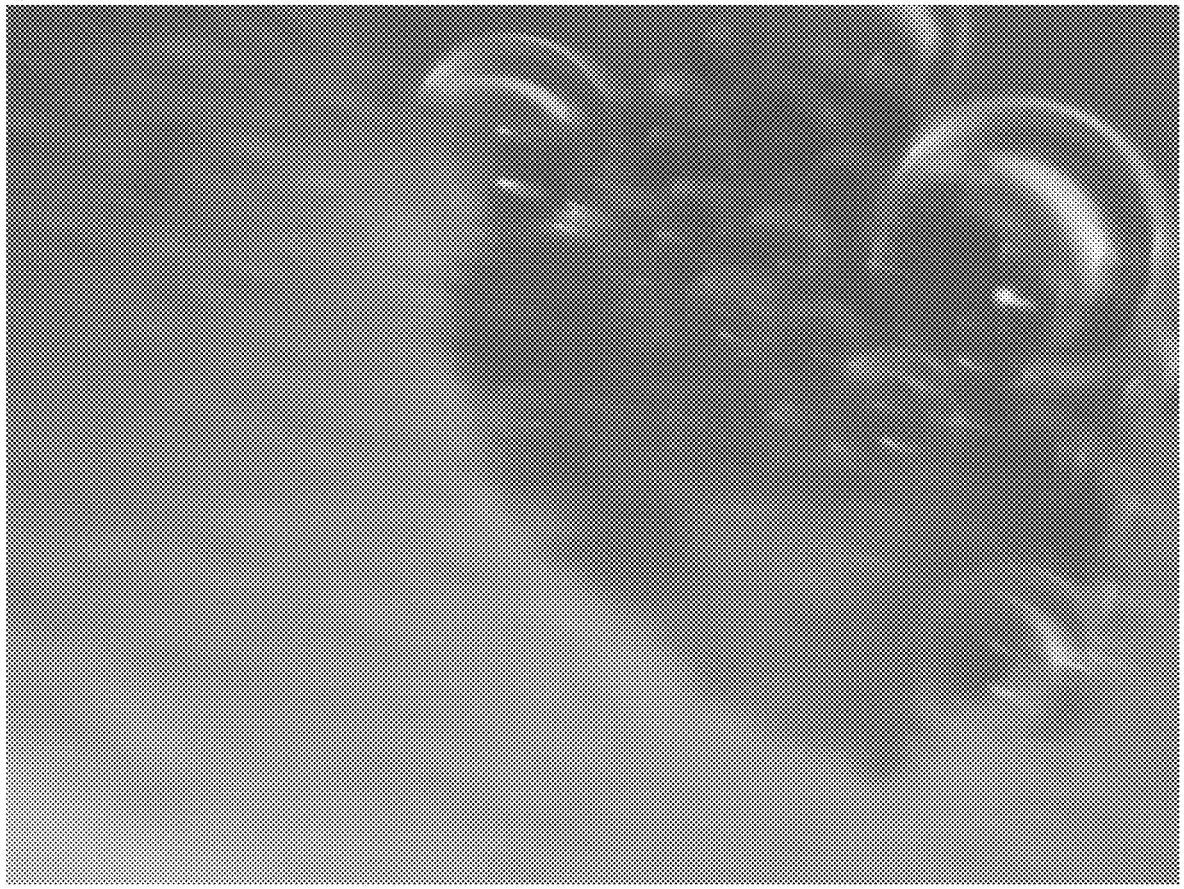
FIG. 15 is a photograph of electrodeposited zinc in a cell containing 1.0 wt % (4-Chlorobenzyl)trimethylammonium Chloride after operating the cell for 1500 s.
Figure 16:
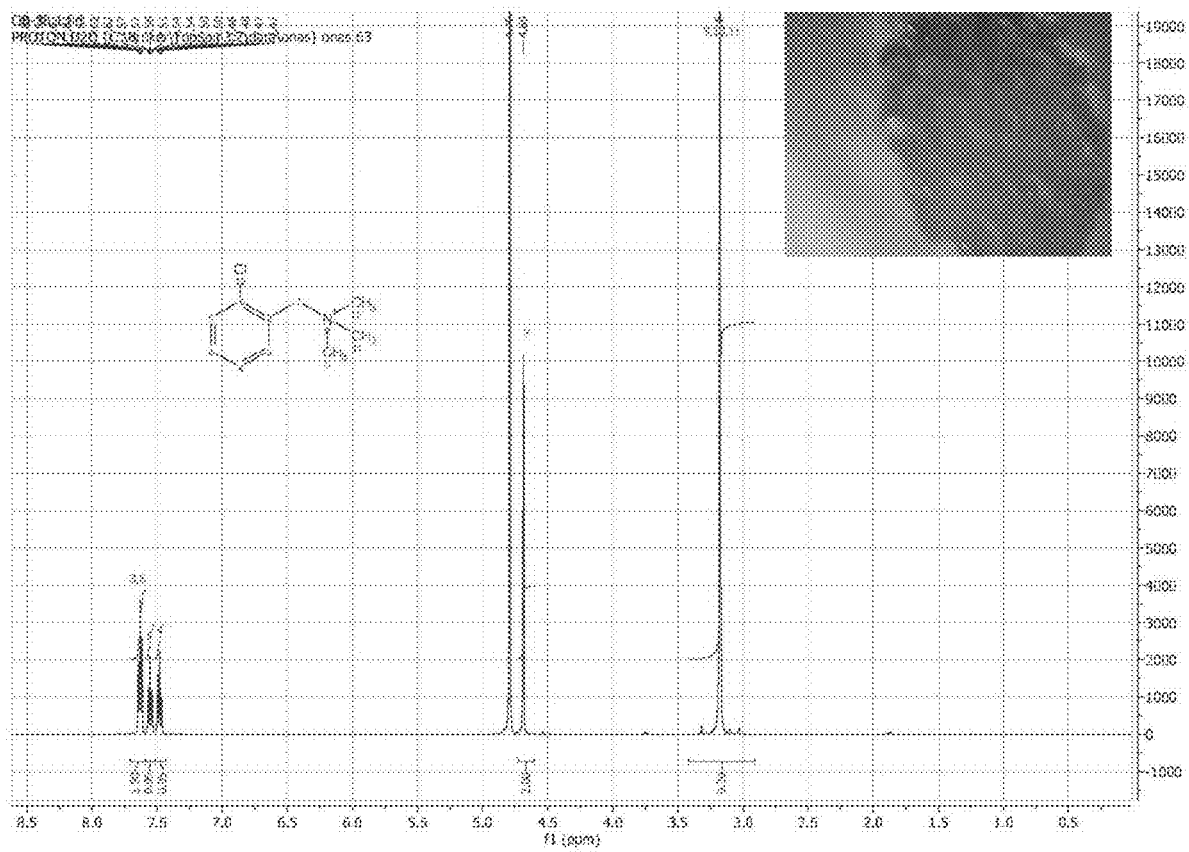
FIG. 16 is $^1$H NMR data for (2-Chlorobenzyl)trimethylammonium Chloride in D$_2$O with an inlay photograph of electrodeposited zinc in a cell containing 1.0 wt % (2-Chlorobenzyl)trimethylammonium Chloride after operating the cell for 1500 s.
Figure 30:
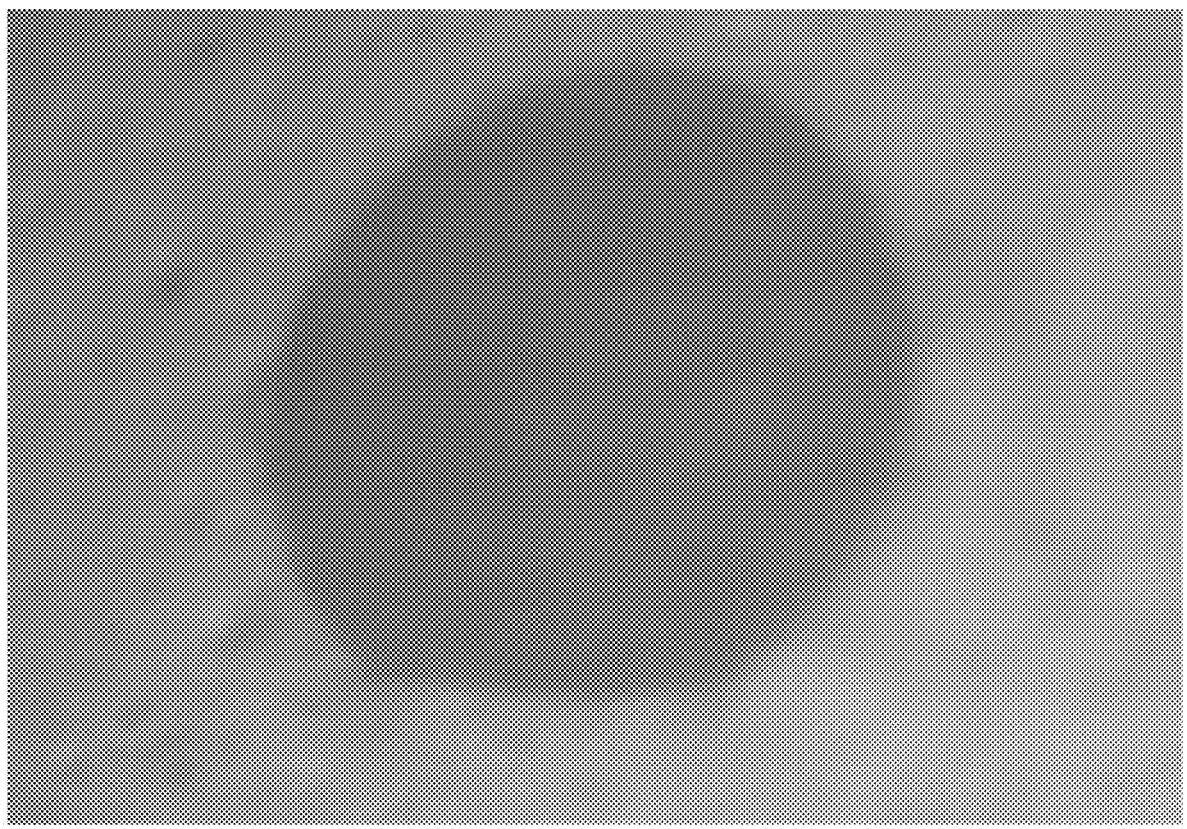
FIG. 30 is a photograph of electrodeposited zinc in a cell containing 15 wt % (4-Methylbenzyl)trimethylammonium chloride after operating the cell for 1500 s.
Figure 31:
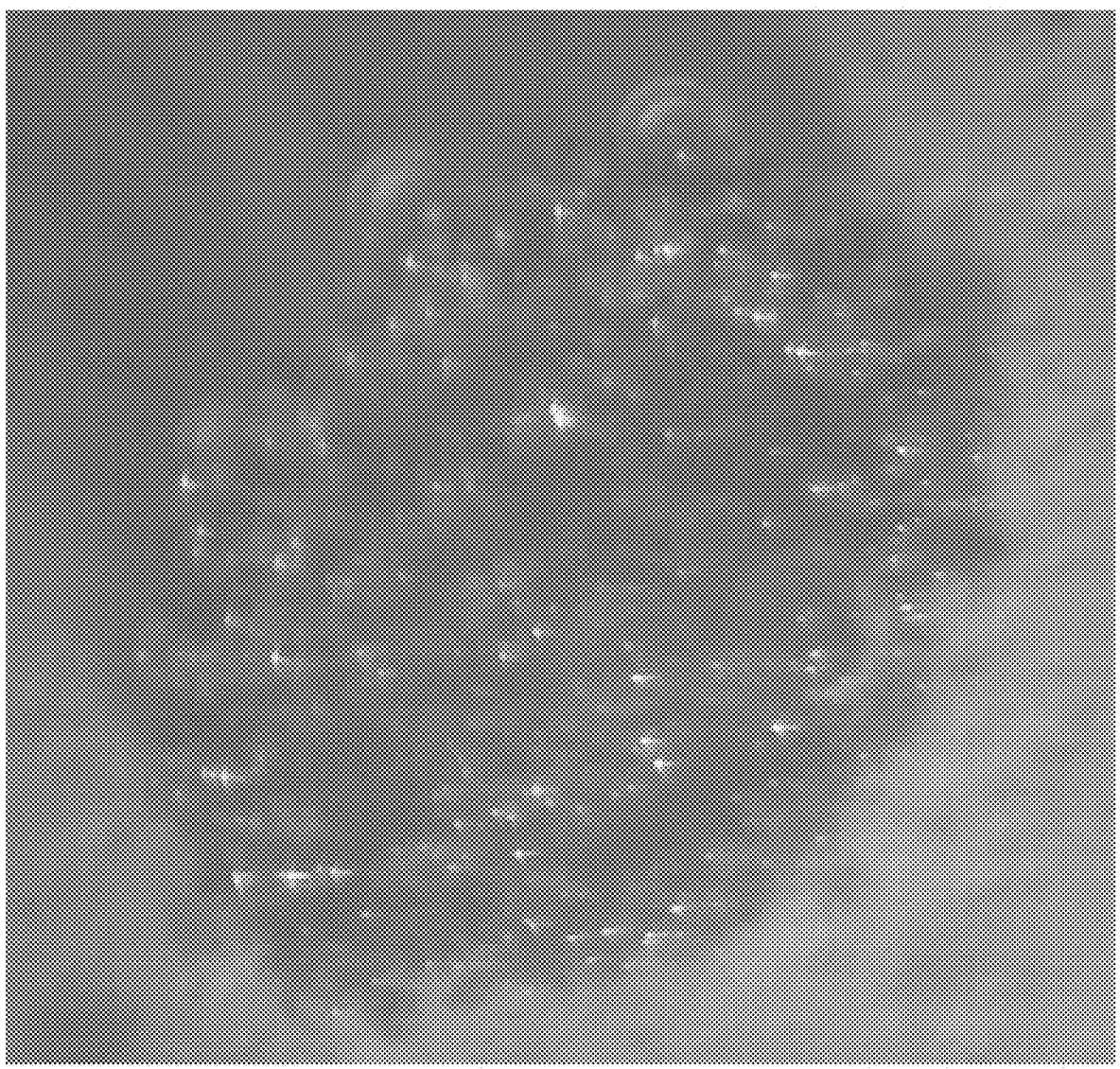
FIG. 31 is a photograph of electrodeposited zinc in a cell containing 0.1 wt % (4-Methylbenzyl)trimethylammonium chloride after operating the cell for 1500 s.

| Additive | Amount (wt %) | Hydrogen Suppressed | Dendrite Suppressed | Figure |
|---|---|---|---|---|
| (4-Methylbenzyl)-trimethylammonium Chloride | 1.0 | Partial | Yes | FIG. 13 |
| (4-Methylbenzyl)trimethylammonium chloride | 15 | Yes | Yes | FIG. 30 |
| (4-Methylbenzyl)trimethylammonium chloride | 0.1 | Partial | Partial | FIG. 31 |
| (2-Methylbenzyl)trimethyl-ammonium Chloride | 1.0 | Partial | Yes | FIG. 14 |
| (4-Chlorobenzyl)-trimethylammonium Chloride | 1.0 | Partial | Partial | FIG. 15 |
| (2-Chlorobenzyl)trimethyl-ammonium Chloride | 1.0 | No | Partial | FIG. 16 |

TABLE I-continued

Suppression of Dendrite Formation by Additives

Figure 17:
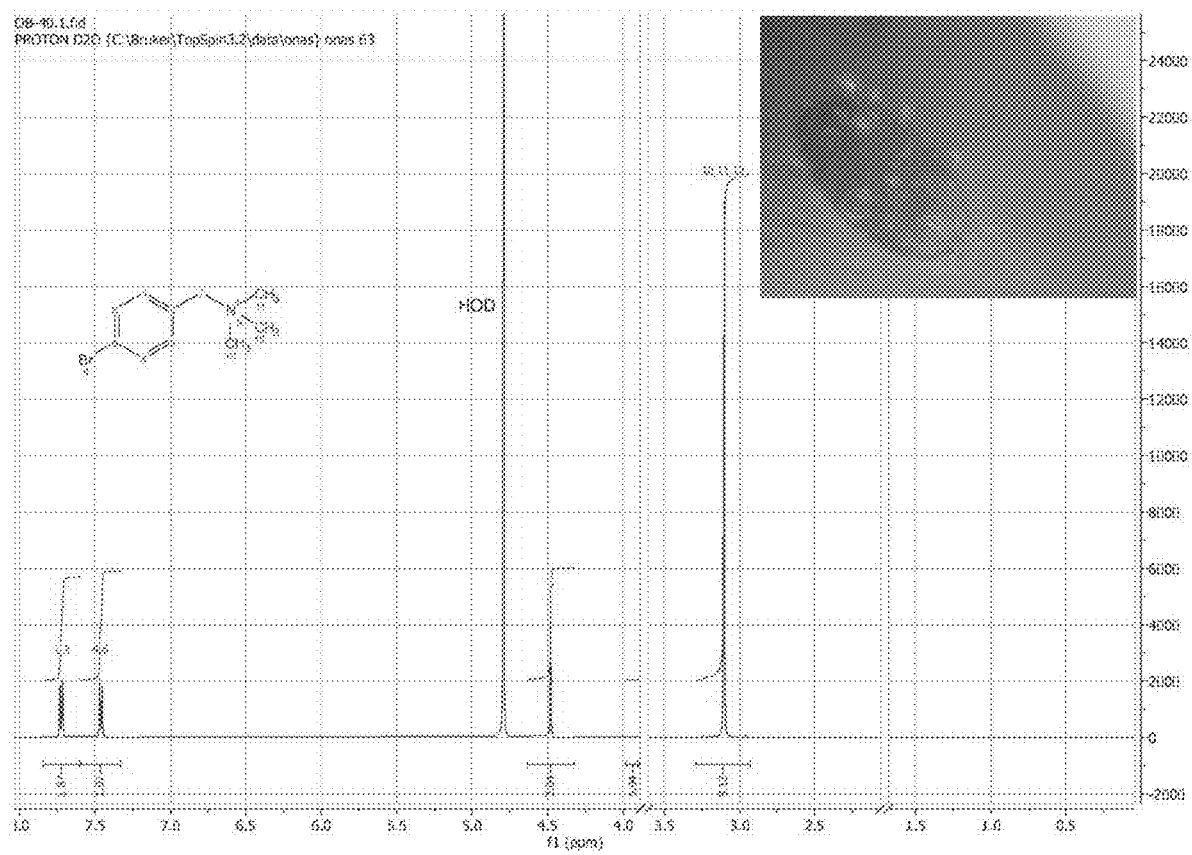
FIG. 17 is $^1$H NMR data for (4-Bromobenzyl)trimethylammonium Bromide in D$_2$O with an inlay photograph of electrodeposited zinc in a cell containing 1.0 wt % (4-Bromobenzyl)trimethylammonium Bromide after operating the cell for 1500 s.
Figure 18:
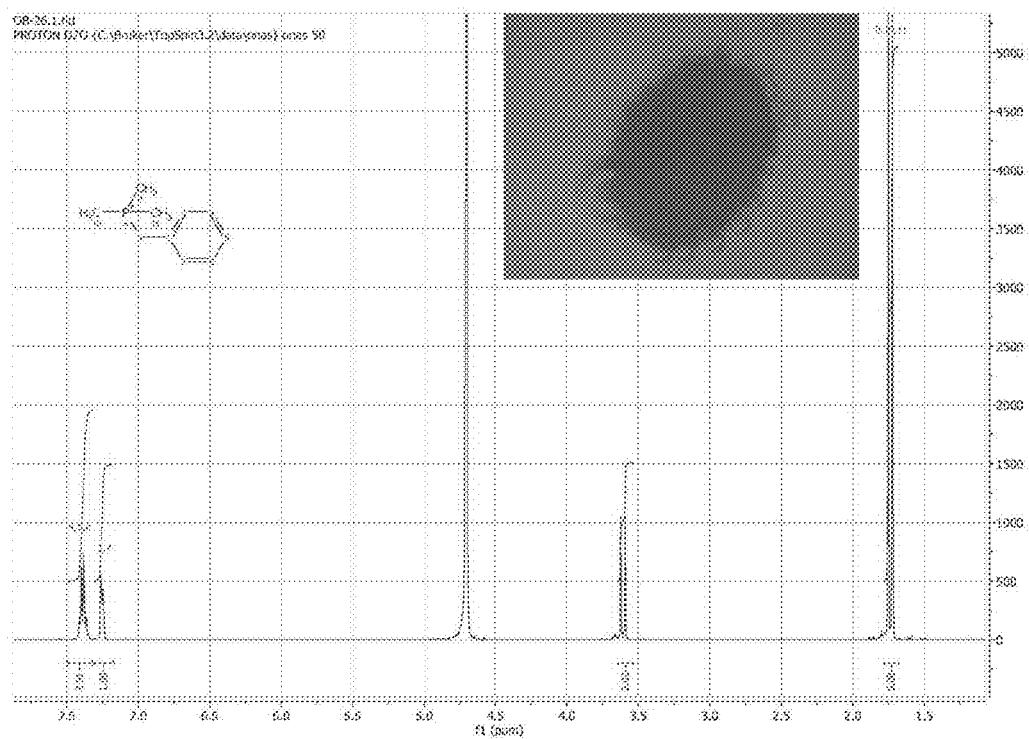
FIG. 18 is $^1$H NMR data for Benzyltrimethylphosphonium Chloride in D$_2$O with an inlay photograph of electrodeposited zinc in a cell containing 1.0 wt % Benzyltrimethylphosphonium Chloride after operating the cell for 1500 s.
Figure 19:
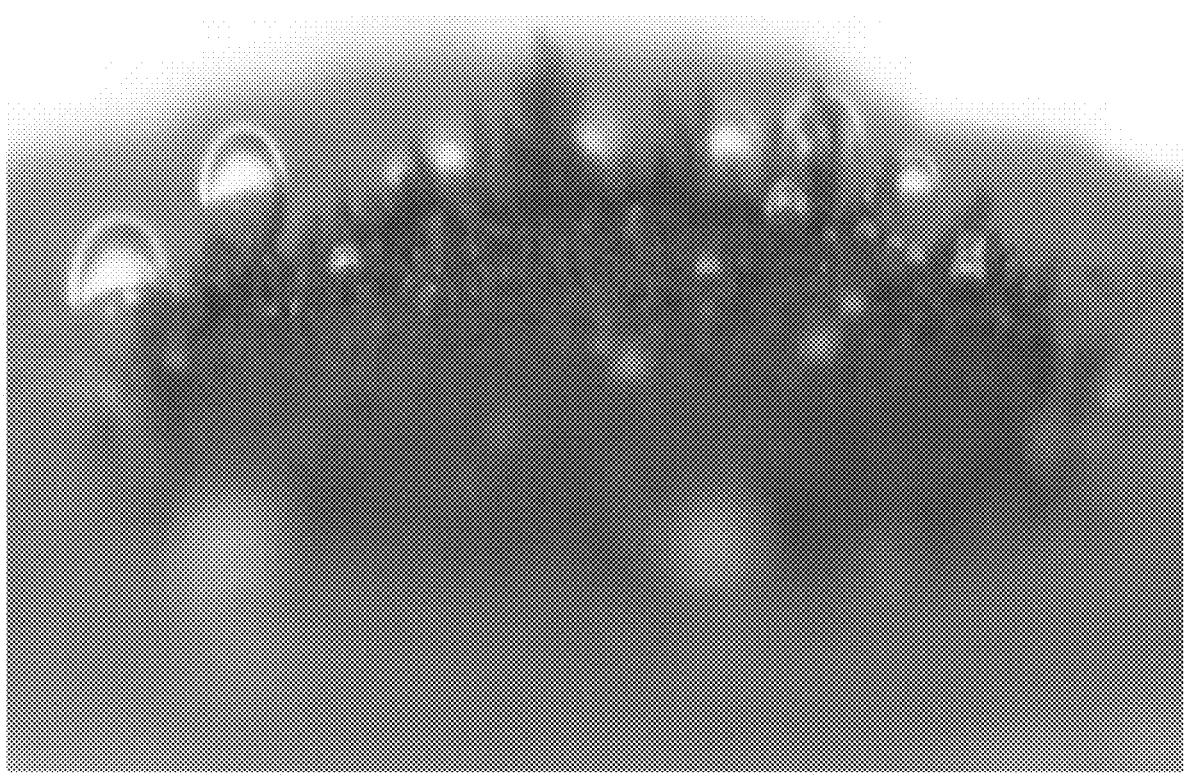
FIG. 19 is a photograph of electrodeposited zinc in a cell containing 1.0 wt % (2-Hydroxybenzyl)trimethylammonium Iodide after operating the cell for 1500 s.
Figure 20:
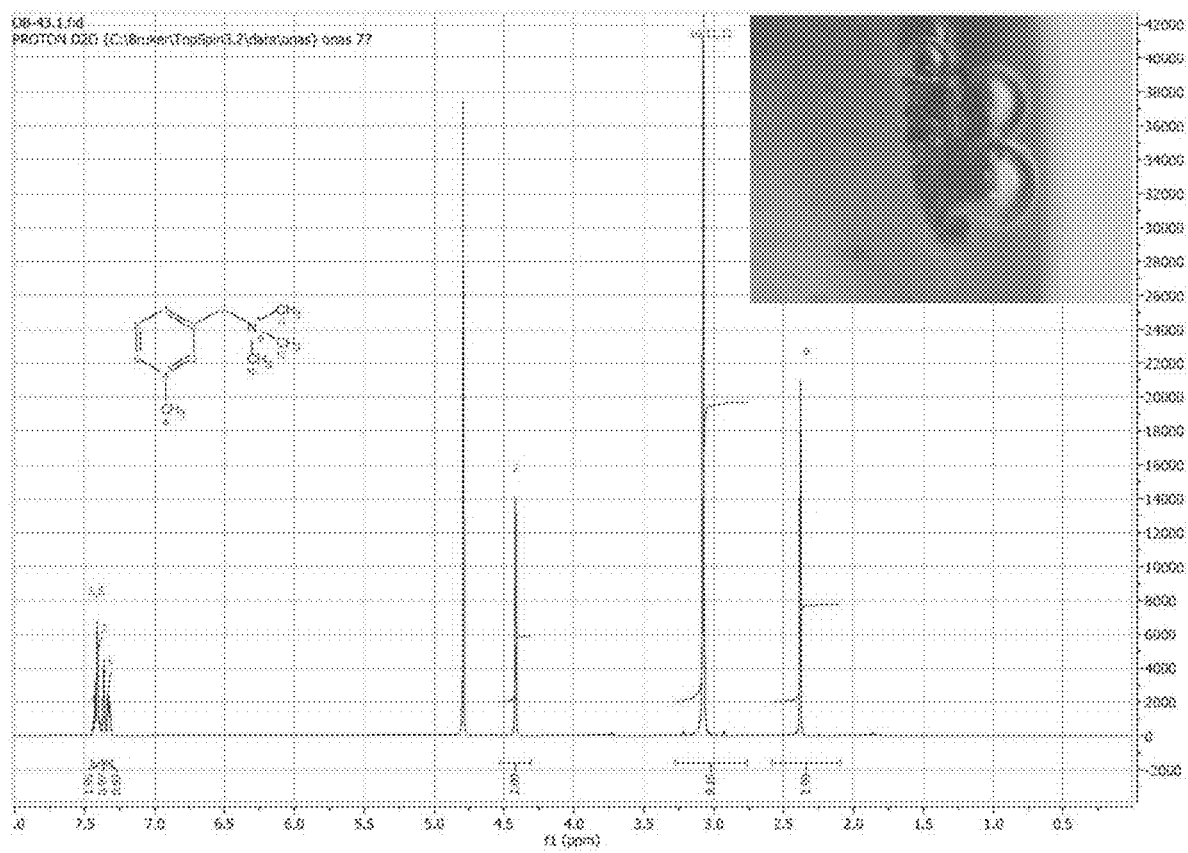
FIG. 20 is $^1$H NMR data for (3-Methylbenzyl)trimethylammonium Chloride in D$_2$O with an inlay photograph of electrodeposited zinc in a cell containing 1.0 wt % (3-Methylbenzyl)trimethylammonium Chloride after operating the cell for 1500 s.

| Additive | Amount (wt %) | Hydrogen Suppressed | Dendrite Suppressed | Figure |
|---|---|---|---|---|
| (4-Bromobenzyl)-trimethylammonium Bromide 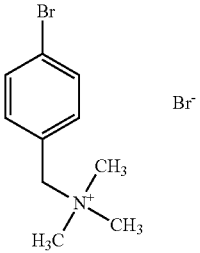 | 1.0 | Partial | Yes | FIG. 17 |
| Benzyltrimethylphosphonium Chloride 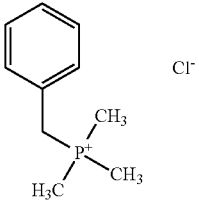 | 1.0 | No | Partial | FIG. 18 |
| (2-Hydroxybenzyl)-trimethylammonium Iodide 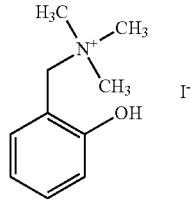 | 1.0 | Partial | Partial | FIG. 19 |
| (3-Methylbenzyl)-trimethylammonium Chloride 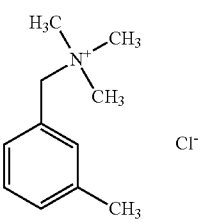 | 1.0 | Partial | Yes | FIG. 20 |

TABLE I-continued

Suppression of Dendrite Formation by Additives

Figure 21:
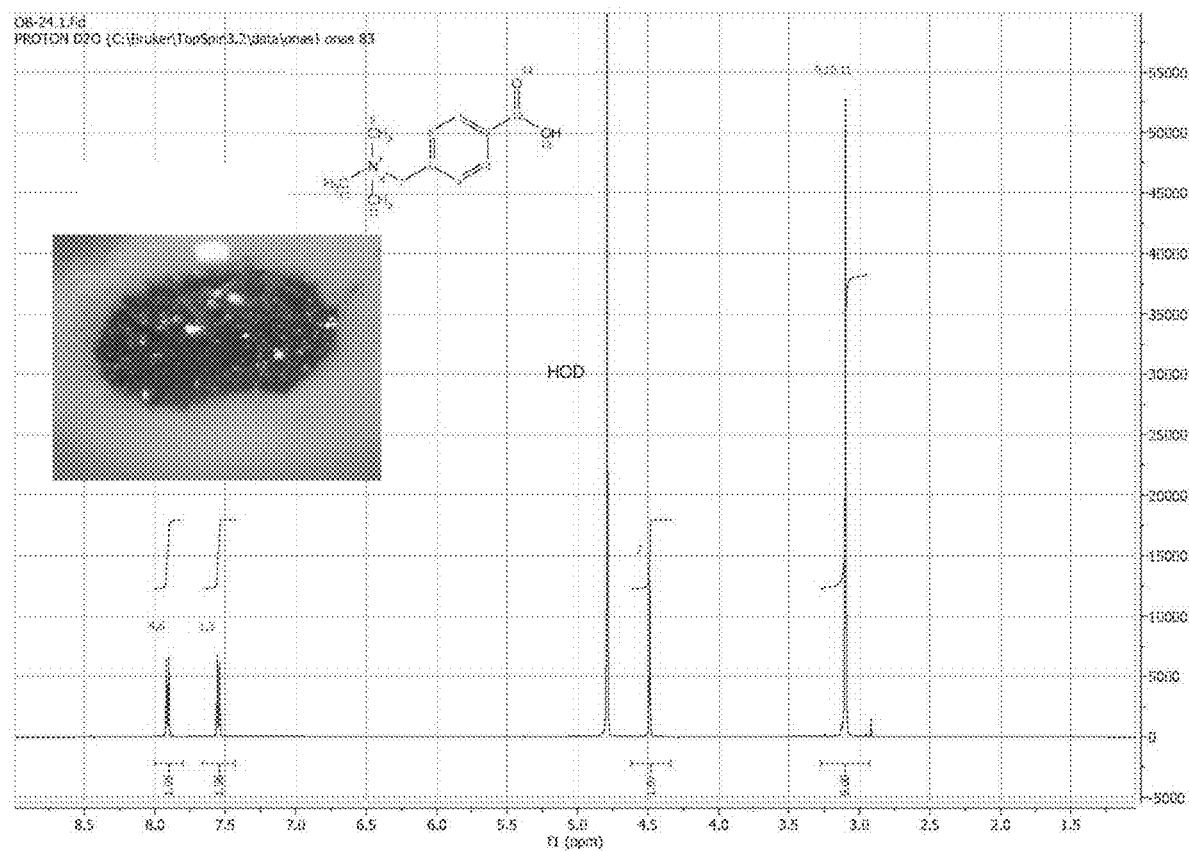
FIG. 21 is $^1$H NMR data for 4-(Trimethylammonium)benzoic acid Bromide in D$_2$O with an inlay photograph of electrodeposited zinc in a cell containing 1.0 wt % 4-(Trimethylammonium methyl)benzoic acid Bromide after operating the cell for 1500 s.
Figure 22:
FIG. 22 is a photograph of electrodeposited zinc in a cell containing 1.0 wt % 3-(Trimethylammonium methyl)anisole Chloride after operating the cell for 1500 s.
Figure 23:
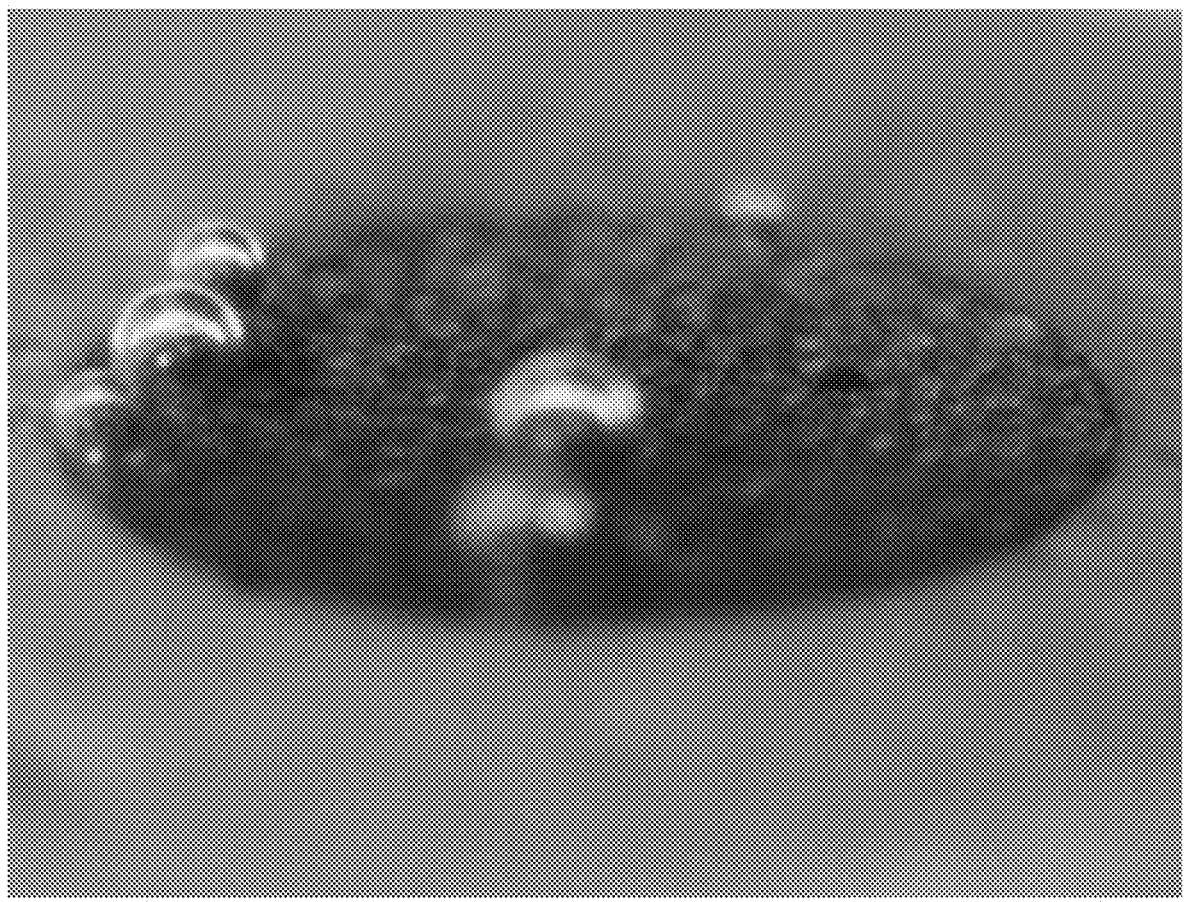
FIG. 23 is a photograph of electrodeposited zinc in a cell containing 1.0 wt % Benzalkonium Chloride after operating the cell for 1500 s.
Figure 24:
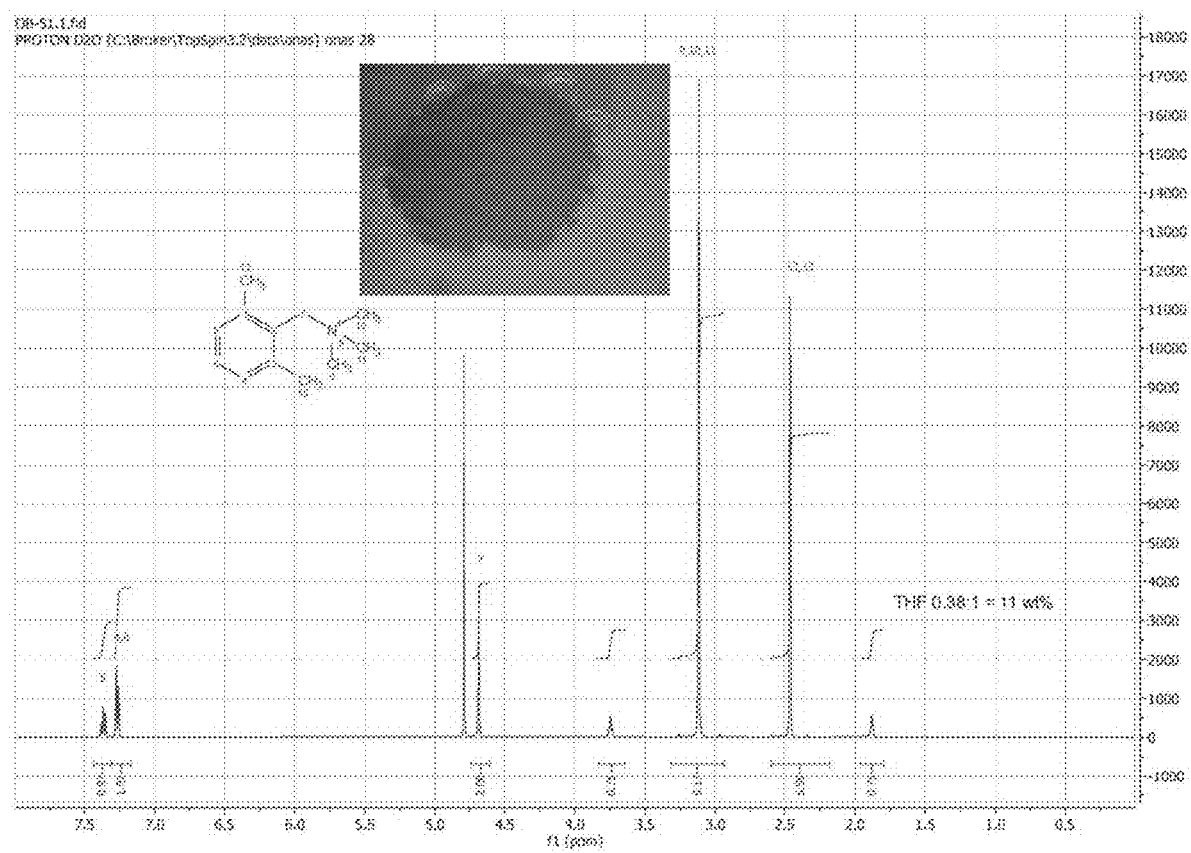
FIG. 24 is $^1$H NMR data for (2,6-Dimethylbenzyl)trimethylammonium Chloride in D$_2$O with an inlay photograph of electrodeposited zinc in a cell containing 1.0 wt % (2,6-Dimethylbenzyl)trimethylammonium.
Figure 25:
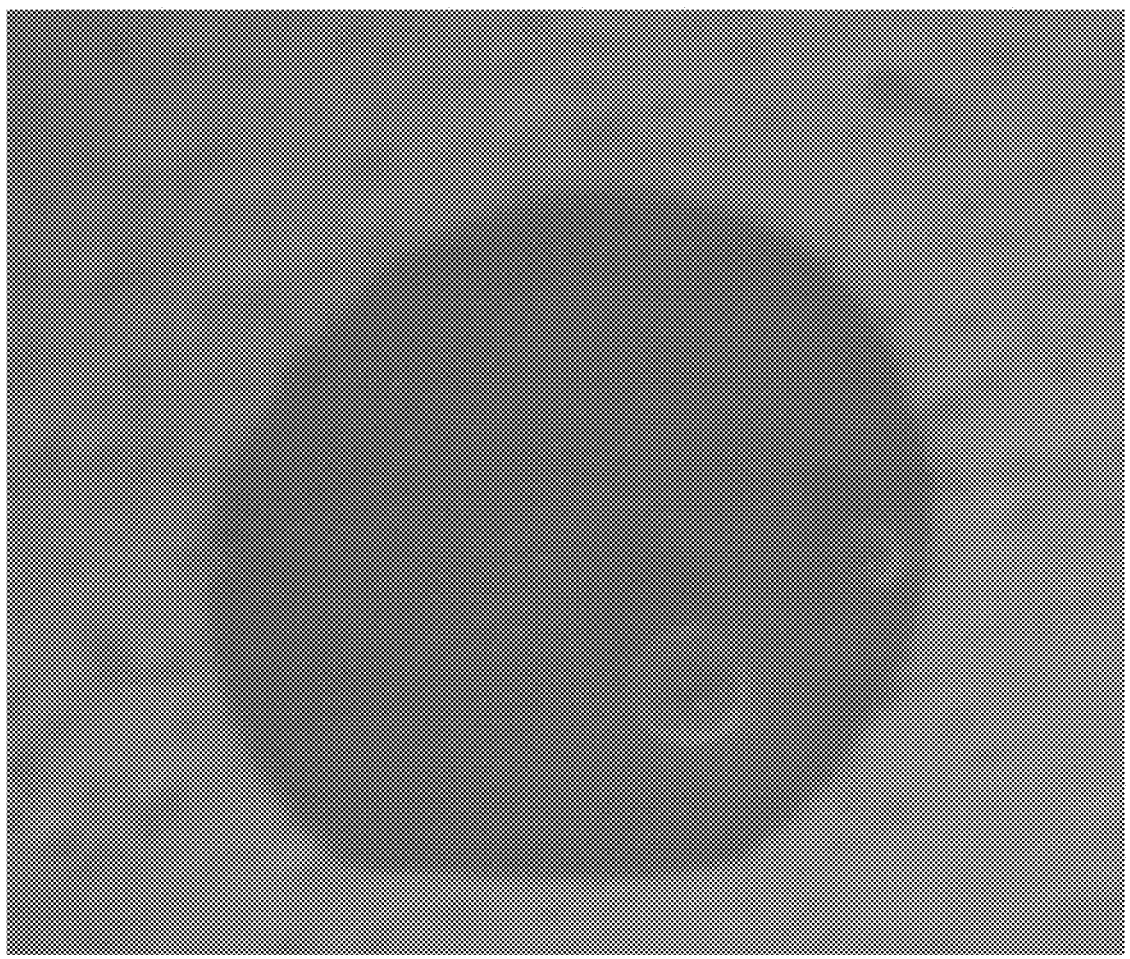
FIG. 25 is a photograph of electrodeposited zinc in a cell containing 25 wt % Benzyltrimethylammonium chloride after operating the cell for 1500 s.

| Additive | Amount (wt %) | Hydrogen Suppressed | Dendrite Suppressed | Figure |
|---|---|---|---|---|
| 4-(Trimethylammonium-methyl)benzoic acid Bromide | 1.0 | Partial | Partial | FIG. 21 |
| 3-(Trimethylammoniummethyl)-anisole Chloride | 1.0 | Partial | Partial | FIG. 22 |
| Benzalkonium Chloride<br>$R^5 = C_nH_{2n+1}$ where $8 \geq n \geq 18$ | 1.0 | Partial | Yes | FIG. 23 |
| (2,6-Dimethylbenzyl)trimethyl-ammonium Chloride | 1.0 | No | Partial | FIG. 24 |
| Benzyltrimethylammonium Hydroxide (BTMAH) | 25 | Yes | Yes | FIG. 25 |

TABLE I-continued

Suppression of Dendrite Formation by Additives

Figure 26:
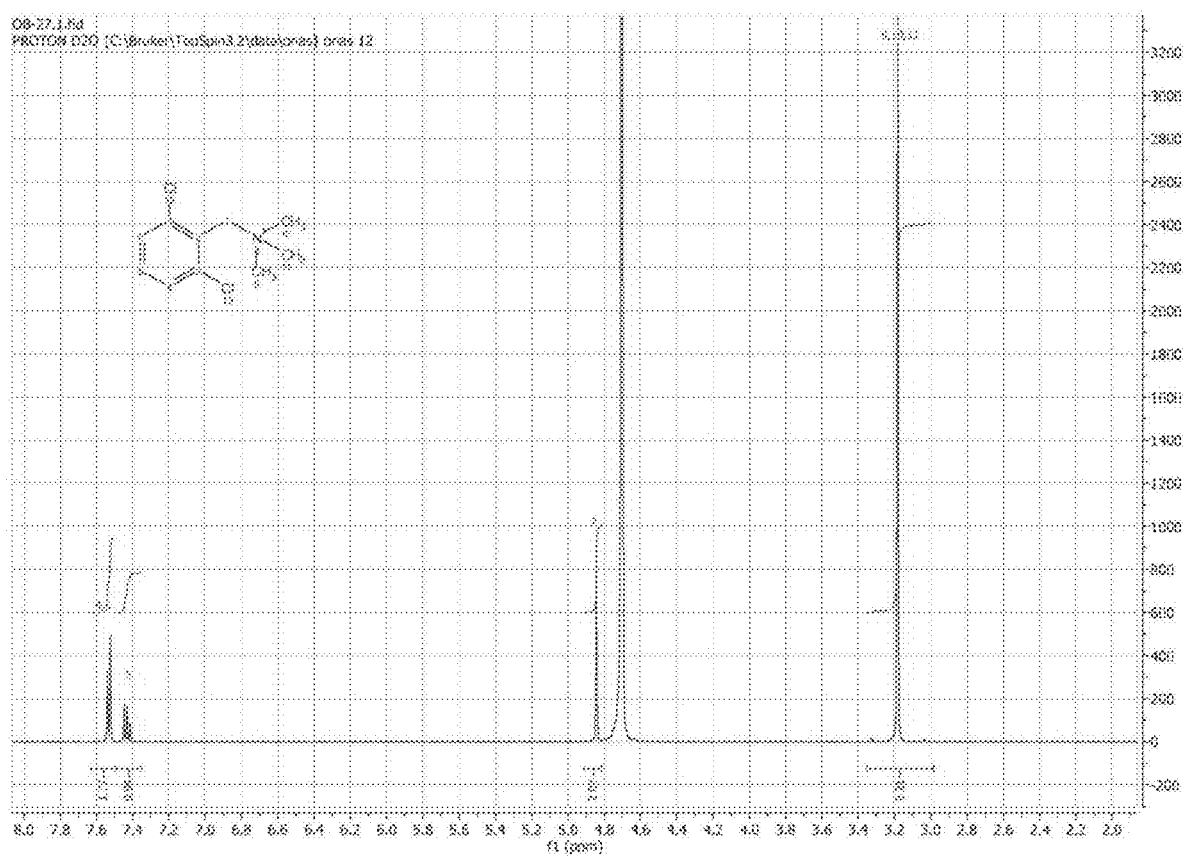
FIG. 26 is $^1$H NMR data for (2,6-Dichlorobenzyl)trimethylammonium chloride in D$_2$O.
Figure 27:
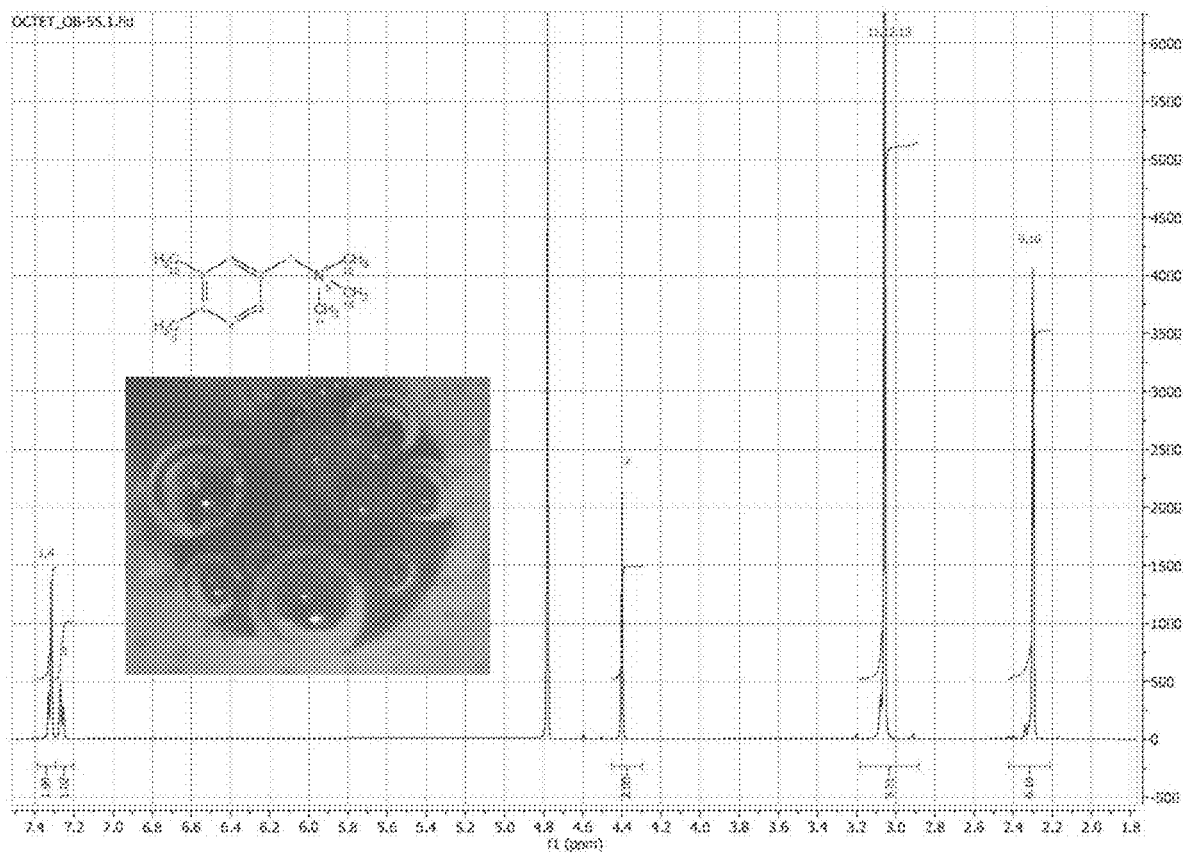
FIG. 27 is $^1$H NMR data for (3,4-Dimethylbenzyl)trimethylammonium chloride in D$_2$O with an inlay photograph of electrodeposited zinc in a cell containing 1.0 wt % (3,4-Dimethylbenzyl)trimethylammonium chloride after operating the cell for 1500 s.
Figure 28:
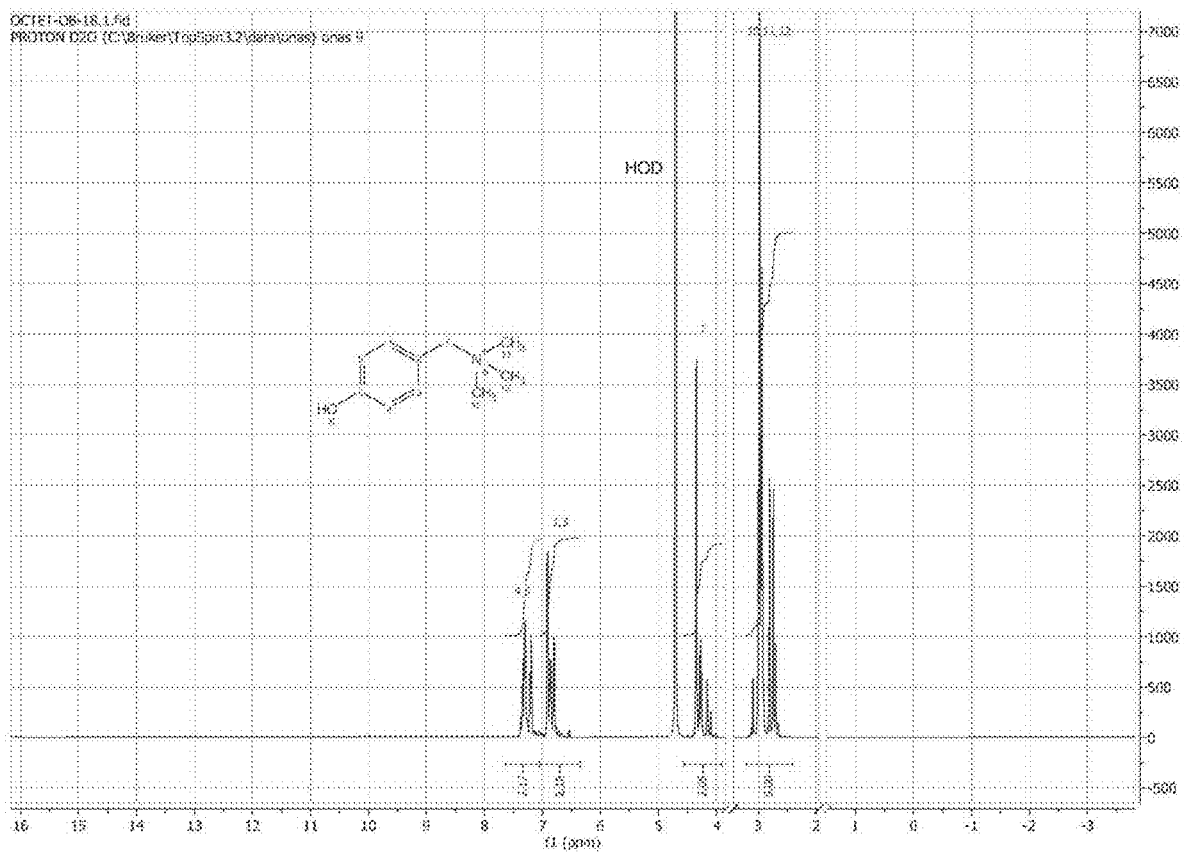
FIG. 28 is $^1$H NMR data for (4-Hydroxybenzyl)trimethylammonium Iodide in D$_2$O.
Figure 29:
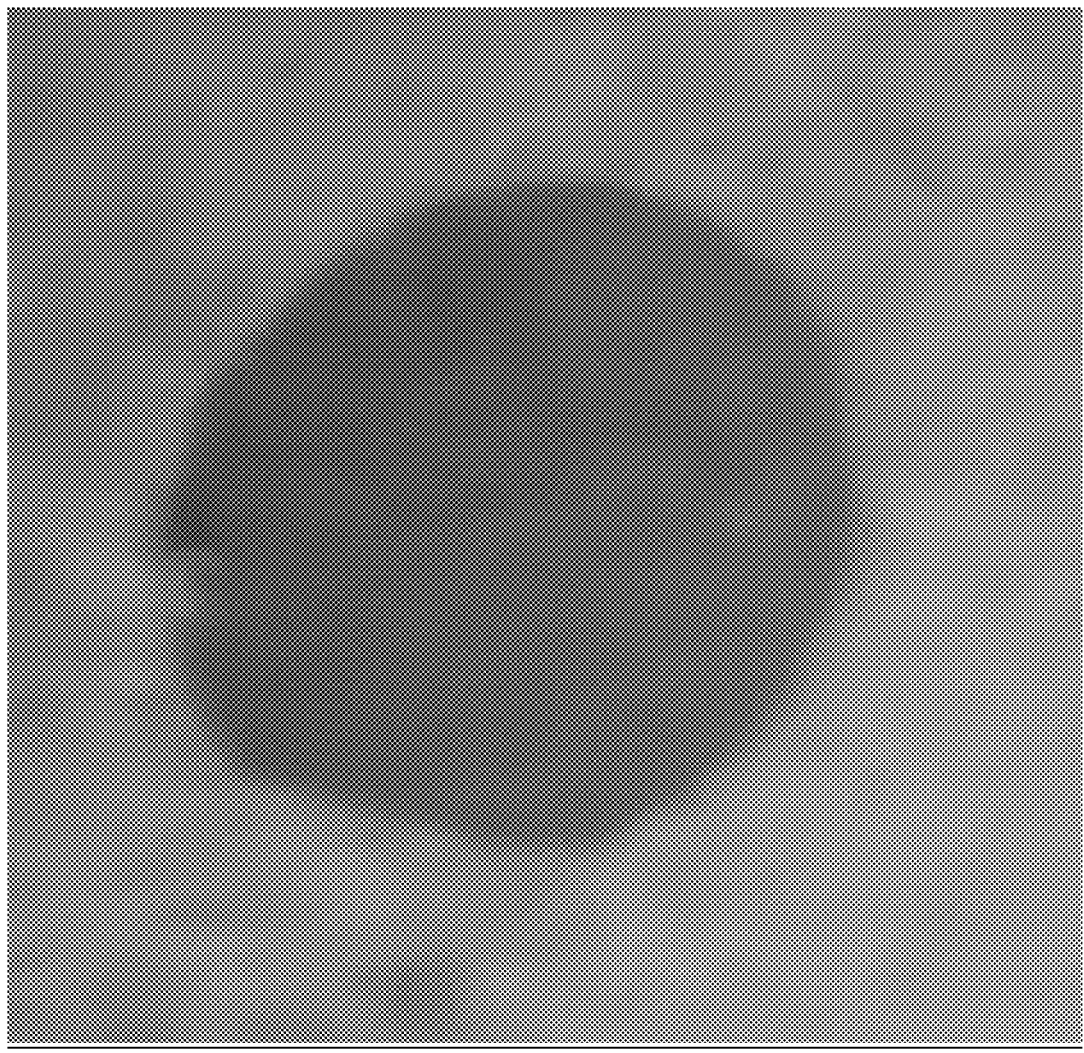
FIG. 29 is a photograph of electrodeposited zinc in a cell containing 15 wt % 4-(Trimethylammoniummethyl)anisole chloride after operating the cell for 1500 s.

| Additive | Amount (wt %) | Hydrogen Suppressed | Dendrite Suppressed | Figure |
|---|---|---|---|---|
| 2,6-Dichlorobenzyl)trimethyl-ammonium Chloride | 1.0 | Partial | No | FIG. 26 |
| (3,4-Dimethylbenzyl)trimethylammonium Chloride | 1.0 | Yes | Yes | FIG. 27 |
| (4-Hydroxybenzyl)-trimethylammonium Iodide | 1.0 | Partial | Partial | FIG. 28 |
| (4-Trimethylammonium-methyl)anisole Chloride | 15 | Yes | Yes | FIG. 29 |

Dibenzyldimethylammonium chloride (DBDMAC) preparation and performance.

N,N-dimethylbenzylamine (2 g, 14.8 mmol) is diluted into 10 mL of acetonitrile and stirred under air. Benzylchloride (2.06 g, 1.87 mL, 16.3 mmol) is added at once and the reaction is heated to 78° C. to reflux for 3 hours. The solution is concentrated under reduced pressure to a colorless viscous oil. The desired product is recrystallized from acetone. A white/colorless crystal solid of 3.50 g is collected (90.4% yield) and its structure is confirmed by $^1$H NMR. The dendrite suppressive effect of this additive is shown in FIGS. 4-6. Full dendrite suppression occurs at 1 wt % and 0.1 wt %, and partial suppression is observed at 0.01 wt %. Hydrogen evolution is partially suppressed at 1 wt % and 0.1 wt %. No hydrogen suppression is observed at 0.01 wt %.

1-(Trimethylammonium methyl)naphthalene Chloride Preparation and Performance.

To a 100 mL flask is added 10 mL of a 13% solution of trimethylamine in tetrahydrofuran (1.16 g, 19.7 mmol). The solution is stirred under air at room temperature. 1-(Chloromethyl)naphthalene (3.80 g, 3.22 mL, 21.5 mmol) is added in four quick portions and the reaction is heated to 60° C. for 3 hours. The reaction is then cooled to room temperature and white precipitates are collected by suction filtration and washed with additional tetrahydrofuran. About 3.10 g of white fluffy powder is collected (67% yield), and the desired product structure is confirmed by $^1$H NMR. The partial dendrite suppressive effect of this additive is shown in FIG. 7. 1-(Trimethylammonium methyl)naphthalene chloride promotes, rather than suppresses, hydrogen evolution.

4-(Trimethylammoniummethyl)benzonitrile Chloride Preparation and Performance.

To a 100 mL flask is added 10 mL of a 13% solution of trimethylamine in tetrahydrofuran (1.16 g, 19.7 mmol). The solution is stirred under air at room temperature. 4-(Chloromethyl)benzonitrile (2.70 g, 17.8 mmol) is added in quick portions and the reaction is heated to 60° C. for 2 hours. The reaction is then cooled to room temperature and white precipitates are collected by suction filtration and washed with additional tetrahydrofuran. About 2.80 g of white fluffy powder is collected (75% yield), and the desired product structure is confirmed by $^1$H NMR. The partial dendrite suppressive effect of this additive is shown in FIG. 8. This additive strongly suppresses hydrogen evolution.

4-(Trimethylammoniummethyl)anisole Chloride Preparation and Performance.

To a 100 mL flask is added 20 mL of a 13% solution of trimethylamine in tetrahydrofuran (2.32 g, 39.4 mmol) and this is stirred under air at room temperature. (4-Methoxybenzyl)chloride (5.59 g, 4.84 mL, 35.7 mmol) is added in quick portions and the reaction is heated to 60° C. for 3 hours. The reaction is then cooled to room temperature and white precipitates are collected by suction filtration and washed with additional tetrahydrofuran. About 7.08 g of white fluffy powder is collected (92% yield) and the desired product structure is confirmed by $^1$H NMR. The dendrite suppressive effect of this additive is shown in FIGS. 9-11. Dendrite suppression is complete under the test conditions at 1 wt % and 0.5 wt %, and partial at 0.1 wt %. Hydrogen evolution is fully suppressed at 1.0 wt % and partially suppressed at 0.5 wt % and 0.01 wt %.

An analogous method is used to synthesize 3-(trimethylammoniummethyl)anisole chloride, as well as similar 4-(trimethylammoniummethyl)-1,2,6-trimethoxybenzene. FIG. 12 shows that 4-(trimethylammoniummethyl)-1,2,6-trimethoxybenzene fully suppresses dendrite formation under the test conditions at 1.0 wt %, and partially suppresses hydrogen evolution. FIG. 22 shows that 3-(trimethylammoniummethyl)anisole chloride fully suppresses hydrogen evolution and dendrite formation.

(4-Methylbenzyl)trimethylammonium Chloride Preparation and Performance.

To a 100 mL flask is added 10 mL of a 13% solution of trimethylamine in tetrahydrofuran (1.16 g, 19.7 mmol). The solution is stirred under air at room temperature. 4-Methylbenzyl chloride (2.75 g, 2.6 ml, 19.5 mmol) is added in quick portions and the reaction is heated to 60° C. for 3 hours. The reaction is then cooled to room temperature and white precipitates are collected by suction filtration and washed with additional tetrahydrofuran. About 2.92 g of white fluffy powder is collected (75% yield) and the desired product structure is confirmed by $^1$H NMR. FIG. 13 shows that 1 wt % (4-methylbenzyl)trimethylammonium chloride fully suppresses dendrite formation under the test conditions, and partially suppresses hydrogen evolution. FIG. 30 shows that 15 wt % (4-methylbenzyl)trimethylammonium chloride fully suppresses dendrite formation and hydrogen evolution under the test conditions. FIG. 31 shows that 0.1 wt % (4-methylbenzyl)trimethylammonium chloride partially suppresses dendrite formation, and less effective in suppressing hydrogen evolution than higher tested concentrations of this additive.

(3,4-dimethylbenzyl)trimethylammonium Chloride Preparation and Performance.

To a 100 mL flask is added 10.0 ml of a 13% solution of trimethylamine in tetrahydrofuran (1.16 g, 19.6 mmol). The solution is stirred under air at room temperature. 3,4-Dimethylbenzyl chloride (2.75 g, 17.8 mmol) is added in quick portions and the reaction is heated to 60° C. for 4 hrs. The reaction is then cooled to room temperature and white precipitates are collected by suction filtration and washed with additional tetrahydrofuran. About 2.75 g of white fluffy powder are collected (73% yield) and the desired product structure is confirmed by $^1$H NMR as shown in FIG. 27. Also shown in FIG. 27 is an inlay photo showing that 1.0 wt % (3,4-dimethylbenzyl)trimethylammonium chloride fully suppresses dendrite formation and fully suppresses hydrogen evolution under the test conditions.

An analogous method is used to synthesize other isomers of this product, namely, (2-methylbenzyl)trimethylammonium chloride and (3-methylbenzyl)trimethylammonium chloride, as well as (2,4-dimethylbenzyl)trimethylammonium chloride, (2,5-dimethylbenzyl)trimethylammonium chloride, (2,6-dimethylbenzyl)trimethylammonium chloride, (3,5-dimethylbenzyl)trimethylammonium chloride, and (2,4,6-trimethylbenzyl)trimethylammonium chloride. FIG. 14 shows that 1 wt % (2-methylbenzyl)trimethylammonium chloride fully suppresses dendrite formation, and partially suppresses hydrogen evolution. FIG. 20 shows that 1 wt % (3-methylbenzyl)trimethylammonium chloride partially suppresses dendrite formation, and partially suppresses hydrogen evolution, under the test conditions.

(4-Chlorobenzyl)trimethylammonium Chloride Preparation and Performance.

To a 100 mL flask is added 10 mL of a 13% solution of trimethylamine in tetrahydrofuran (1.16 g, 19.7 mmol). The solution is stirred under air at room temperature. 4-Chlorobenzyl chloride (2.86 g, 17.8 mmol) is added in quick portions and the reaction is heated to 60° C. for 3 hours. The reaction is then cooled to room temperature and the white precipitates are collected by suction filtration and washed with additional tetrahydrofuran. About 3.17 g of white fluffy powder are collected (82% yield) and the desired product structure is confirmed by $^1$H NMR. FIG. 15 shows that 1 wt % (4-chlorobenzyl)trimethylammonium chloride partially suppresses dendrite formation, and hydrogen evolution, under the test conditions.

An analogous method is used to synthesize (2-chlorobenzyl)trimethylammonium chloride, (3-chlorobenzyl)trimethylammonium chloride, (2-bromobenzyl)trimethylammonium bromide, (3-bromobenzyl)trimethylammonium bromide, and (4-bromobenzyl)trimethylammonium bromide, with the later three using reagent bromobenzyl bromide in place of chlorobenzyl chloride. Similarly, iodobenzyl chlorides are used in an analogous method to produce (2-iodobenzyl)trimethylammonium chloride, (3-bromobenzyl)trimethylammonium chloride, and (4-iodobenzyl)trimethylammonium chloride. FIG. 16 shows that (2-chlorobenzyl)trimethylammonium chloride does not suppress dendrite formation under the test conditions, but does partially suppress hydrogen evolution. FIG. 17 shows that 1 wt % (4-bromobenzyl)trimethylammonium bromide fully suppresses dendrite formation under the test conditions, and partially suppress hydrogen evolution.

Benzyltrimethylphosphonium Chloride Preparation and Performance.

To a 100 mL flask is added 10 mL of a 1M solution of trimethylphosphine in tetrahydrofuran (1.52 g, 20, ml, 20 mmol). The solution is stirred under nitrogen at room temperature. Benzylchloride (2.52 g, 2.3 ml, 20.0 mmol) is added in quick portions and the reaction is heated to 60° C. for 3 hours. The reaction is then cooled to room temperature and white precipitates are collected by brief suction filtration. About 1.80 g of white fluffy powder is collected (44% yield) and the desired product structure is confirmed by ¹H NMR. FIG. 18 shows that 1 wt % benzyltrimethylphosphonium chloride partially suppresses dendrite formation, but does not suppress hydrogen evolution, under the test conditions.

(2-Hydroxybenzyl)trimethylammonium Iodide Preparation and Performance.

To a 100 mL flask is added 2-[(Dimethylamino)methyl] phenol (2.45 g, 16.2 mmol) and tetrahydrofuran (25 mL). The clear solution is cooled to 0° C. by an ice bath under air and with magnetic stirring. To this solution iodomethane (3.45 g, 24.3 mmol) is added dropwise. After stirring for 20 minutes the ice bath is removed and the reaction proceeds at room temperature for 3 hours as a viscous oil forms at the bottom of the flask. The solvents are removed from the reaction by reduced pressure (Rotavap) to a mass of orange/brown amorphous solid measuring 4.6 g (94% yield). The desired product structure is confirmed by ¹H NMR. FIG. 19 shows that 1 wt % (2-hydroxybenzyl)trimethylammonium iodide partially suppresses dendrite formation, and partially suppresses hydrogen evolution, under the test conditions.

4-(Trimethylammoniummethyl)benzoic Acid Bromide Preparation.

To a 100 mL flask is added 8.0 mL of a 13% solution of trimethylamine in tetrahydrofuran (0.92 g, 15.6 mmol) is diluted in 30 mL acetonitrile. The solution is stirred under air at room temperature. Then, 4-(bromomethyl)benzoic Acid (3.36 g, 15.6 mmol) is added in quick portions and the reaction is heated to 80° C. for 3 hrs. The reaction is then cooled to room temperature and white precipitates are collected by suction filtration and washed with additional tetrahydrofuran. About 4.10 g of white solids are collected (95.6% yield) and the desired product structure is confirmed by ¹H NMR. FIG. 21 shows that 1 wt % 4-(Trimethylammoniummethyl)benzoic acid bromide partially suppresses dendrite formation, and partially suppresses hydrogen evolution, under the test conditions.

(2,6-Dimethylbenzyl)trimethylammonium Chloride Preparation.

To a 100 mL flask is added 9.1 mL of a 13% solution of trimethylamine in tetrahydrofuran (1.05 g, 17.8 mmol). The solution is stirred under air at room temperature. 2,6-Dimethylbenzyl chloride (2.5 g, 16.2 mmol) is added in quick portions and the reaction is heated to 60° C. for 3 hrs. The reaction is then cooled to room temperature and the white precipitates are collected by suction filtration and washed with additional tetrahydrofuran. About 3.05 g of white fluffy powder are collected (88% yield) and the desired product structure is confirmed by 1H NMR. FIG. 24 shows that 1.0 wt % (2,6-Dimethylbenzyl)trimethylammonium chloride partially suppresses dendrite formation, but does not suppress hydrogen evolution, under the test conditions.

FIG. 23 shows that 1.0 wt % Benzalkonium Chloride is effective in fully suppressing dendrite formation and hydrogen evolution under the test condition. The tested additive is a mixture having the following formula, where $R^5=C_nH_{2n+1}$ where 8<n<18:

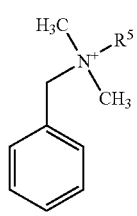

Figure 32:
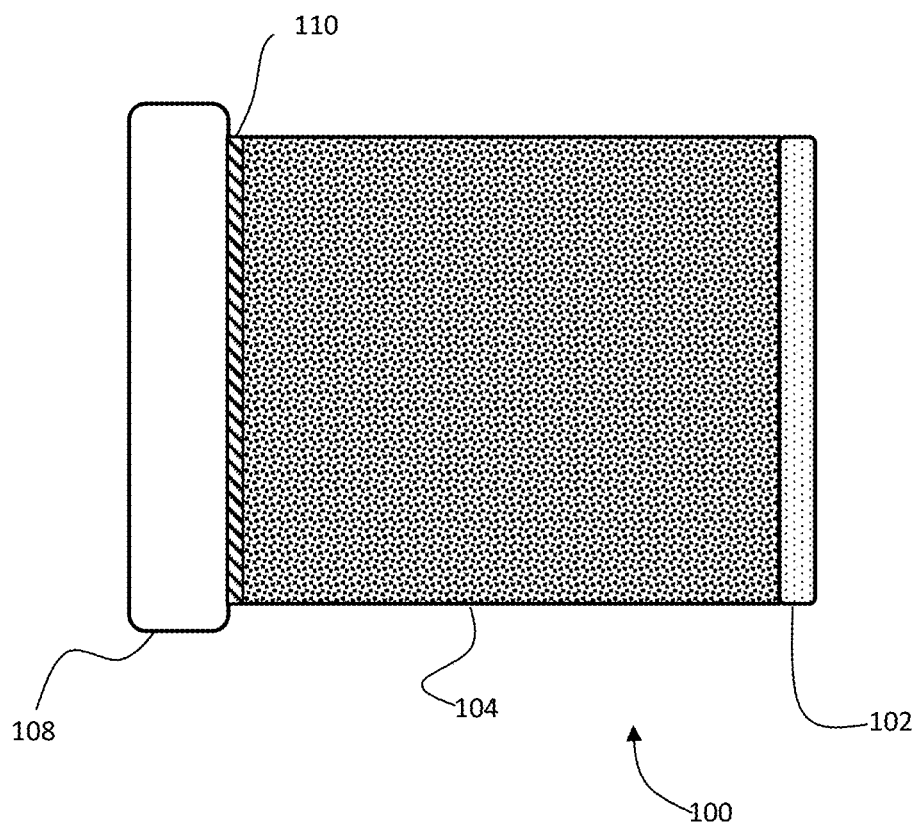
FIG. 32 is a schematic view of a general zinc-based battery in accordance with one or more embodiments of the invention.

FIG. 32 shows a schematic view of a zinc-battery cell 100. The cell includes a zinc anode 102 in communication with a cathode 108 through an electrolyte 104. A porous separator 110 such as a membrane may be interposed between the cathode 108 and the electrolyte 104. The person having ordinary skill in the art will readily appreciate that the cathode may comprise a wide variety of known materials such as without limitation, air and carbon.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed:

I claim:

1. A zinc battery cell, comprising:
a cathode in electric communication with a zinc anode through an aqueous electrolyte, wherein the cathode is carbon or air; and
wherein the electrolyte comprises an amount of an electrolyte additive effective for use in reducing dendrite formation and hydrogen evolution, comprising:

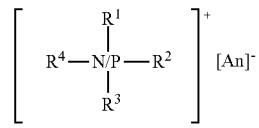

wherein, N/P is a central nitrogen or central phosphorous atom having a +1 charge;
wherein R1 is selected from the group consisting of, 4-methylene-toluene, 3-methylene-toluene, 2-methylene-toluene, 4-methylene-chlorobenzene, 3-methylene-chlorobenzene, 2-methylene-chlorobenzene, 4-methylene-bromobenzene, 3-methylene-bromobenzene, 2-methylene-bromobenzene, 4-methylene-iodobenzene, 3-methylene-iodobenzene, 2-methylene-iodobenzene, 4-methylene-cyanobenzene, 3-methylene-cyanobenzene, 2-methylene-cyanobenzene, 4-methylene-anisole, 3-methylene-anisole, 2-methylene-anisole, 1-methylnaphthalene, 1-methylene-2,6-dimethylbenzene, 1-methylene-2, 4-dimethylebenzene, 1-methylene-3,4-dimethylbenzene, 1-methylene-2, 5-dimethylbenzene, 1-methylene-3,5-dimethylbenzene, 1-methylene-2,4, 6-trimethylbenzene, 1-methylene-3,4,5-trimethoxybenzene, 1-methylene-2, 6-dichlorobenzene, 4-methylene-nitrobenzene, 4-methylene-benzoic acid, 3-methylene-benzoic acid, 2-methylene-benzoic acid, 2-methylene-phenol, 3-methylene-phenol, and 4-methylene-phenol;
wherein R2, R3, and R4 are independently selected from R1, or a linear or non-linear alkyl group from C1 to C25; and, wherein [An]⁻ is a counter anion.

2. The zinc battery cell of claim 1, wherein the electrolyte additive is present in a concentration between 0.01 wt % and 25.0 wt %.

3. The zinc battery of claim 1, wherein the counter anion is selected from chloride, bromide, iodide, fluoride, hydroxide, nitrate, nitrite, sulphate, sulphite, phosphate, perchlorate, or any combination thereof.

4. The zinc battery of claim 1, wherein R2, R3, and R4 are independently selected from methyl, ethyl, n-propyl, n-butyl, n-pentyl, n-hexyl, n-octyl, n-decyl, n-dodecyl, n-tetradecyl, n-hexadecyl, or n-octadecyl.

* * * * *